United States Patent
Hwang et al.

(10) Patent No.: US 11,553,483 B2
(45) Date of Patent: *Jan. 10, 2023

(54) MEASURING A SIGNAL FROM A NEIGHBORING DEVICE

(71) Applicant: LG ELECTRONICS INC., Seoul (KR)

(72) Inventors: Jinyup Hwang, Seoul (KR); Yoonoh Yang, Seoul (KR); Sangwook Lee, Seoul (KR); Suhwan Lim, Seoul (KR); Manyoung Jung, Seoul (KR); Jongkeun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 149 days.

This patent is subject to a terminal disclaimer.

(21) Appl. No.: 17/064,942

(22) Filed: Oct. 7, 2020

(65) Prior Publication Data
US 2021/0029696 A1    Jan. 28, 2021

Related U.S. Application Data

(63) Continuation of application No. 16/856,464, filed on Apr. 23, 2020, now Pat. No. 10,805,925.

(30) Foreign Application Priority Data

May 1, 2019   (KR) .................. 10-2019-0051139
Sep. 30, 2019  (KR) .................. 10-2019-0120740

(51) Int. Cl.
*H04W 72/04*   (2009.01)
*H04W 72/08*   (2009.01)
(Continued)

(52) U.S. Cl.
CPC ....... *H04W 72/0446* (2013.01); *H04L 5/0073* (2013.01); *H04L 5/14* (2013.01); *H04W 72/082* (2013.01); *H04B 2201/709709* (2013.01)

(58) Field of Classification Search
CPC .......... H04W 72/0446; H04W 72/082; H04W 56/005; H04L 5/0073; H04L 5/14; H04L 5/1469; H04L 5/0048; H04B 2201/709709
See application file for complete search history.

(56) References Cited

U.S. PATENT DOCUMENTS

| | | |
|---|---|---|
| 9,344,985 B2 | 5/2016 | Loehr ............... H04W 56/0005 |
| 2011/0098054 A1 | 4/2011 | Gorokhov ............. H04L 5/0035 455/452.1 |

(Continued)

OTHER PUBLICATIONS

3GPP TSG RAN WG1 Meeting #96, LS on UE-UE CLI measurement/reporting and Network coordination mechanism for CLI, Mar. 1, 2019, R1-1903677 (Year: 2019).*
(Continued)

*Primary Examiner* — Tejis Daya
(74) *Attorney, Agent, or Firm* — Dentons US LLP

(57) ABSTRACT

A disclosure of the present specification provides a method for performing measurements. The method may performed by a user equipment (UE) comprise: performing, by the UE, measurements; based on that (i) the measurements are for measuring a cross link interference (CLI) and (ii) that the measurements are performed on a sounding reference signal (SRS) from a neighboring UE in a neighboring cell, adjusting a time error between a downlink reference timing in a serving cell and a SRS arrival timing from the neighboring UE. The adjustment is performed based on offset.

20 Claims, 24 Drawing Sheets

(51) Int. Cl.
*H04L 5/00* (2006.01)
*H04L 5/14* (2006.01)

(56) References Cited

U.S. PATENT DOCUMENTS

| | | | |
|---|---|---|---|
| 2013/0121186 A1 | 5/2013 | Vajapeyam | H04W 72/085 370/252 |
| 2013/0295983 A1 | 11/2013 | Kim | H04W 52/383 455/522 |
| 2014/0029586 A1* | 1/2014 | Loehr | H04W 56/0005 370/336 |
| 2014/0086219 A1 | 3/2014 | Suzuki | H04W 56/0005 370/336 |
| 2015/0189610 A1* | 7/2015 | Siomina | H04L 5/14 370/280 |
| 2016/0302165 A1 | 10/2016 | Da | H04W 56/002 |
| 2018/0323916 A1* | 11/2018 | Yang | H04L 1/248 |
| 2019/0191403 A1 | 6/2019 | Goel | H04B 17/336 |
| 2019/0363810 A1 | 11/2019 | Luo | H04J 11/0056 |
| 2020/0169341 A1 | 5/2020 | Hwang | H04B 17/345 |
| 2021/0289374 A1* | 9/2021 | Zhang | H04B 7/0695 |

OTHER PUBLICATIONS

3GPP TSG RAN WG1 AH NR#1 Meeting, Discussion on Measurement and RS Design for CLI Mitigation, Jan. 20, 2017, R1-1700271 (Year: 2017).*

5G; NR; Requirement for support of radio resource management, Oct. 2018, ETSI TS 138 133 v15.3.0 (Year: 2018).

* cited by examiner

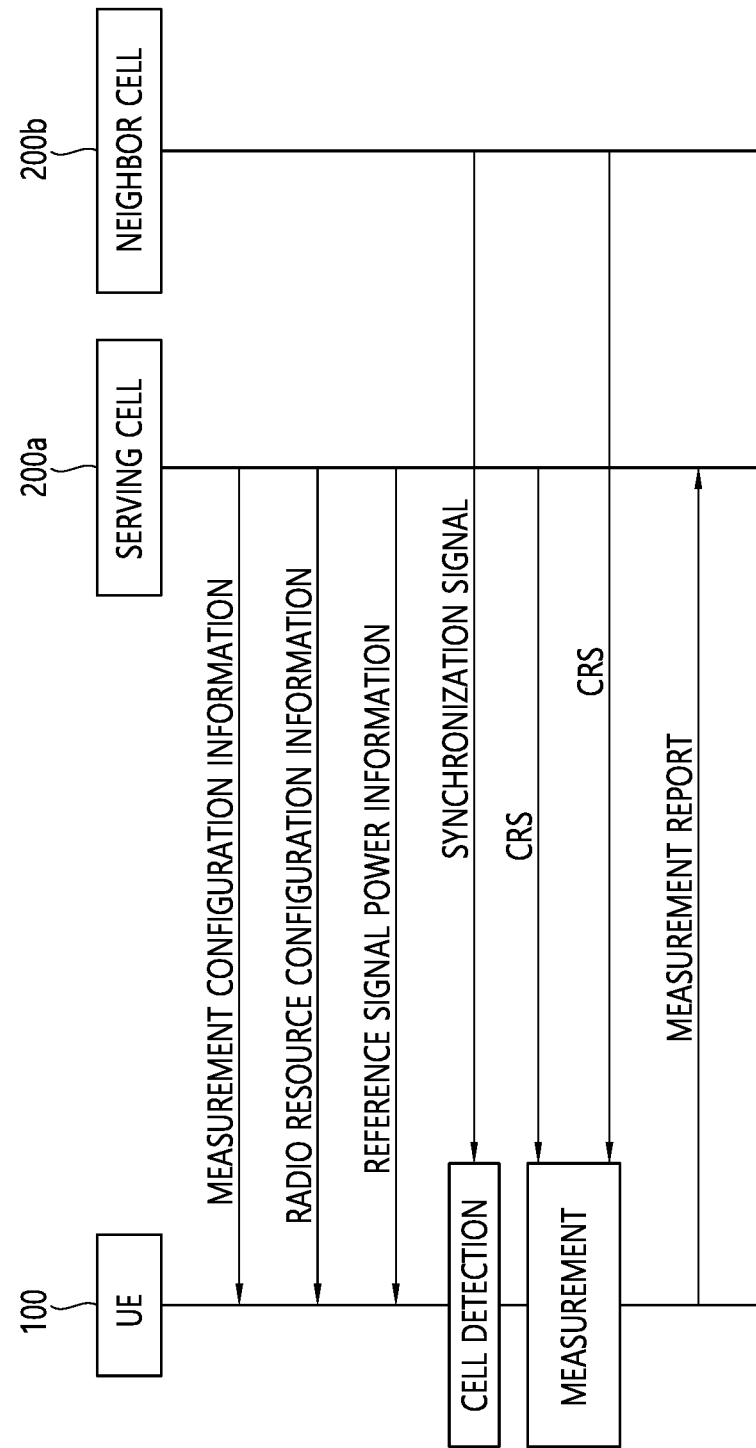

● : UE receving SRS (DL cell)

✳ : UE transmitting SRS (UL cell)

FIG. 14
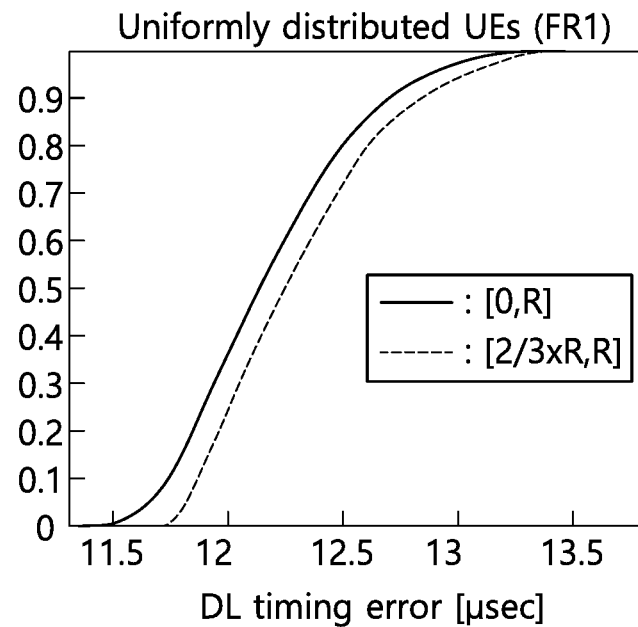
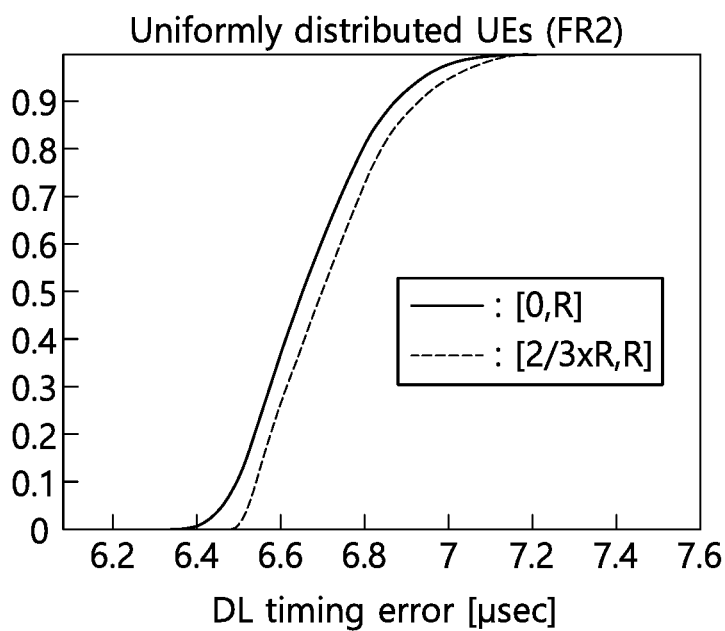

MEASURING A SIGNAL FROM A NEIGHBORING DEVICE

CROSS-REFERENCE TO RELATED APPLICATIONS

Pursuant to 35 U.S.C. § 119 (e), this application is a continuation application of U.S. patent application Ser. No. 16/856,464, filed on Apr. 23, 2020, which claims the benefit of Korean Patent Applications No. 10-2019-0051139, filed on May 1, 2019 and No. 10-2019-0120740, filed on Sep. 30, 2019, the contents of which are all hereby incorporated by reference herein in their entirety.

BACKGROUND OF THE INVENTION

Field of the Invention

The present disclosure relates to mobile communication.

Related Art

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

An NR cell may operate not just in standalone deployment (SA), but also in a non-standalone deployment (NSA). According to the NSA deployment, a UE may be connected in dual connectivity (DC) with an E-UTRAN (that is, LTE/LTE-A) cell and the NR cell. This type of dual connectivity is called EN-DC.

Meanwhile, Time Division Duplex (TDD) and Frequency Division Duplex (FDD) can also be used in NR as in LTE/LTE-A.

In the case of TDD, a ratio of DL to UL can be set differently by changing a DL/UL configuration in response to the amount of traffic. However, when the same frequency band or a neighboring frequency band is used, a serving cell and a neighboring cell (or including a case in which a serving cell provider differs from a neighboring cell provider) may use the same DL/UL configuration in order to minimize the influence of interference. In this case, DL/UL configuration flexibility decreases.

However, there is no efficient method for using a DL/UL ratio in response to the amount of traffic of a cell more efficiently.

SUMMARY OF THE INVENTION

Accordingly, a disclosure of the present specification has been made in an effort to solve the aforementioned problem.

Accordingly, in an effort to solve the aforementioned problem, a disclosure of the present specification provides a method for performing measurements. The method may be performed by a user equipment (UE) comprise: performing, by the UE, measurements; and based on that (i) the measurements are for measuring a cross link interference (CLI) and (ii) that the measurements are performed on a sounding reference signal (SRS) from a neighboring UE in a neighboring cell, adjusting a time error between a downlink reference timing in a serving cell and a SRS arrival timing from the neighboring UE.

According to the disclosure of the present disclosure, the problem of the conventional technology described above may be solved.

BRIEF DESCRIPTION OF THE DRAWINGS

FIG. 3 illustrates a procedure for cell detection and measurement.

FIG. 10b illustrates one example of Timing Advance (TA) for compensating for the time delay shown in FIG. 10a.

FIG. 14 illustrates a timing difference due to location and frequency.

DESCRIPTION OF EXEMPLARY EMBODIMENTS

Figure 1:
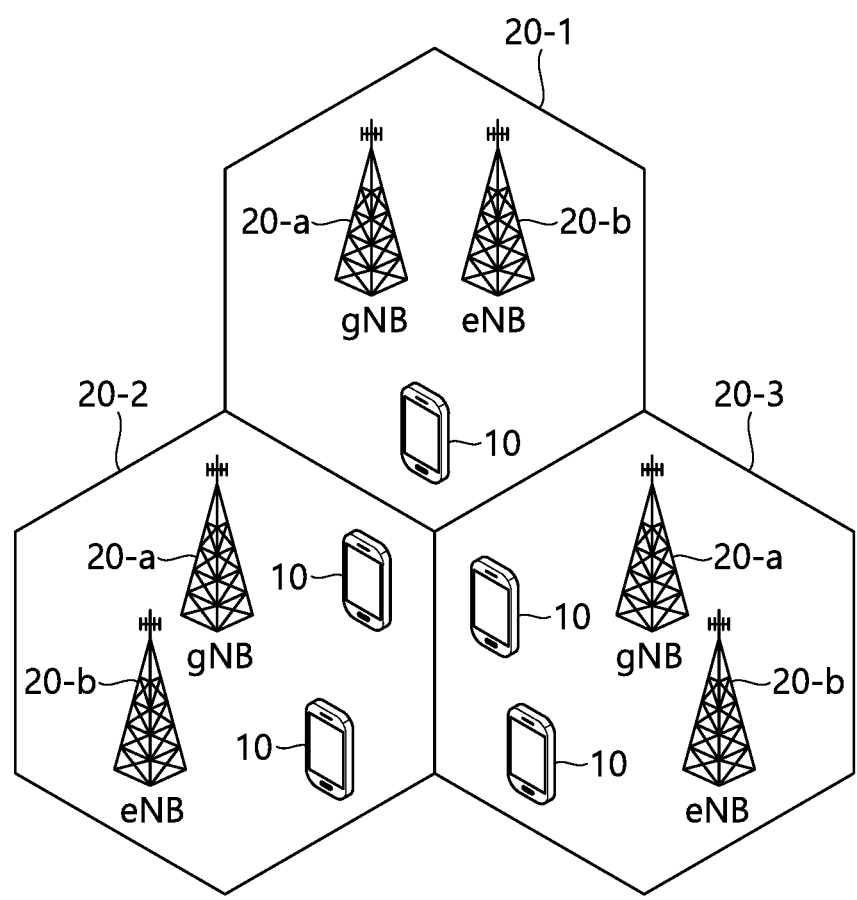
FIG. 1 is a wireless communication system.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the disclosure, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the disclosure unclear will be omitted. The accompanying drawings are provided to merely make the spirit of the disclosure readily understood, but not should be intended to be limiting of the disclosure. It should be understood that the spirit of the disclosure may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS). The BS is classified into a gNB 20a and an eNB 20b. The gNB 20a is for 5G mobile communication such as NR. And, the eNB 20b is for 4G mobile communication such as LTE or LTE-A Each BS (e.g., gNB 20a and eNB 20b) provides a communication service to specific geographical areas (generally, referred to as cells) 20-1, 20-2, and 20-3. The cell can be further divided into a plurality of areas (sectors).

The UE 10 generally belongs to one cell and the cell to which the UE belong is referred to as a serving cell. A BS that provides the communication service to the serving cell is referred to as a serving BS. Since the wireless communication system is a cellular system, another cell that neighbors to the serving cell is present. Another cell which neighbors to the serving cell is referred to a neighbor cell. A BS that provides the communication service to the neighbor cell is referred to as a neighbor BS. The serving cell and the neighbor cell are relatively decided based on the UE.

Hereinafter, a downlink means communication from the BS 20 to the UE 10 and an uplink means communication from the UE 10 to the BS 200. In the downlink, a transmitter may be a part of the BS 20 and a receiver may be a part of the UE 10. In the uplink, the transmitter may be a part of the UE 10 and the receiver may be a part of the BS 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Introduction of Dual Connectivity (DC)>

Recently, a scheme for simultaneously connecting UE to different base stations, for example, a macro cell base station and a small cell base station, is being studied. This is called dual connectivity (DC).

In DC, the eNodeB for the primary cell (Pcell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (Pcell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

Hereinafter, the LTE system will be described in detail.

Figure 2:
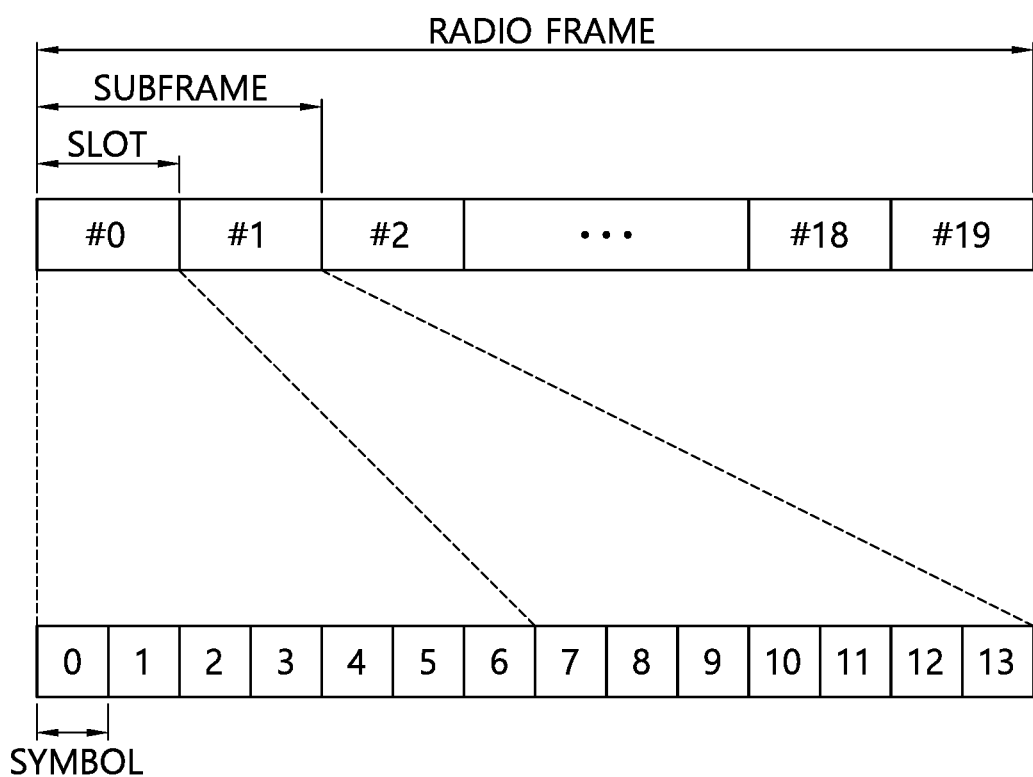
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

One slot includes $N_{RB}$ resource blocks (RBs) in the frequency domain. For example, in the LTE system, the number of resource blocks (RBs), i.e., $N_{RB}$, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

<Measurement and Measurement Report>

Supporting mobility of a UE 100 is essential in a mobile communication system. Thus, the UE 100 constantly measures a quality of a serving cell which is currently providing a service, and a quality of a neighbor cell. The UE 10 reports a result of the measurement to a network at an appropriate time, and the network provides optimal mobility to the UE through a handover or the like. Measurement for this purpose is referred to as a Radio Resource Management (RRM).

Meanwhile, the UE 100 monitors a downlink quality of a primary cell (Pcell) based on a CRS. This is so called Radio Link Monitoring (RLM).

FIG. 3 shows a procedure for cell detection and measurement.

Referring to FIG. 3, a UE detects a neighbor cell based on Synchronization Signal (SS) which is transmitted from the neighbor cell. The SS may include a Primary Synchronization Signal (PSS) and a Secondary Synchronization Signal (SSS).

When the serving cell 200a and the neighbor cell respectively transmit Cell-specific Reference Signals (CRSs), the UE 100 measures the CRSs and transmits a result of the measurement to the serving cell 200a. In this case, the UE 100 may compare power of the received CRSs based on received information on a reference signal power.

At this point, the UE 100 may perform the measurement in the following three ways.

1) RSRP (reference signal received power): This represents an average reception power of all REs that carry the CRS which is transmitted through the whole bands. In this case, instead of the CRS, an average reception power of all REs that carry the CSI RS may also be measured.

2) RSS (received signal strength indicator): This represents a reception power which is measured through the whole bands. The RSSI includes all of signal, interference and thermal noise.

3) RSRQ (reference symbol received quality): This represents a CQI, and may be determined as the RSRP/RSSI according to a measured bandwidth or a sub-band. That is, the RSRQ signifies a signal-to-noise interference ratio (SINR). Since the RSRP is unable to provide a sufficient mobility, in handover or cell reselection procedure, the RSRQ may be used instead of the RSRP.

The RSRQ may be obtained by RSSI/RSSP.

Meanwhile, the UE 100 receives a radio resource configuration information element (IE) from the serving cell 100a for the measurement. The radio resource configuration information element (IE) is used to configure/modify/cancel a radio bearer or to modify a MAC configuration. The radio resource configuration IE includes subframe pattern information. The subframe pattern information is information on a measurement resource restriction pattern on the time domain, for measuring RSRP and RSRQ of a serving cell (e.g., PCell).

Meanwhile, the UE 100 receives a measurement configuration information element (IE) from the serving cell 100a for the measurement. A message including the measurement configuration information element (IE) is called a measurement configuration message. Here, the measurement configuration information element (IE) may be received through an RRC connection reconfiguration message. If the measurement result satisfies a report condition in the measurement configuration information, the UE reports the measurement result to a base station. A message including the measurement result is called a measurement report message.

The measurement configuration IE may include measurement object information. The measurement object information is information of an object which is to be measured by the UE. The measurement object includes at least one of an intra-frequency measurement object which is an object of intra-cell measurement, an inter-frequency measurement object which is an object of inter-cell measurement and an inter-RAT measurement object which is an object of inter-RAT measurement. For example, the intra-cell measurement object indicates a neighbor cell that has a frequency band which is identical to that of a serving cell, the inter-cell measurement object indicates a neighbor cell that has a frequency band which is different from that of a serving cell, and the inter-RAT measurement object indicates a neighbor cell of a RAT which is different from that of a serving cell.

TABLE 1

Measurement object field description
carrierFreq
This indicates an E-UTRA carrier frequency to which this configuration is applied.
Measurement object field description
measCycleS Cell
This indicates a cycle for measurement of a secondary cell (SCell) in a non-activated state. Its value may be set to 40, 160, 256, etc. If the value is 160, it indicates that measurement is performed every 160 subframes.

Meanwhile, the measurement configuration IE includes an information element (IE) as shown in the following table.

TABLE 2

MeasConfig field description
allowInterruptions
If its value is True, it indicates that interruption of transmission and reception with a serving cell is allowed when measurement of subcarriers of an Scell in a non-active state is performed using MeasCycleScell.
measGapConfig
It indicates configuration or cancelation of a measurement gap.

The "measGapConfig" is used to configure or cancel a measurement gap (MG). The MG is a period for cell identification and RSRP measurement on an inter frequency different from that of a serving cell.

TABLE 3

MeasGapConfig field description
gapOffset
Any one of gp0 and gp1 may be set as a value of gapOffset.
gp0 corresponds to a gapoffset of pattern ID "0" having MGRP = 40 ms.
gp1 corresponds to a gapoffset of pattern ID "1" having MGRP = 80 ms.

TABLE 4

| Gap pattern Id | Measurement Gap Length (MGL) | Measurement Gap Repetition Period (MGRP) | Minimum available time for inter-frequency and inter-RAT measurements during 480 ms period |
|---|---|---|---|
| 0 | 6 ms | 40 ms | 60 ms |
| 1 | 6 ms | 80 ms | 30 s |

When the UE requires a measurement gap to identify and measure a cell at an inter-frequency and inter-RAT, the E-UTRAN (i.e., the base station) may provide a single measurement gap (MG) pattern with a predetermined gap period to the UE. Without transmitting or receiving any data from the serving cell for the measurement gap period, the UE retunes its RF chain to be adapted to the inter-frequency and then performs measurement at the corresponding inter-frequency.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carriers different from a component carrier basically linked with the specific component carrier.

<Introduction of Dual Connectivity (DC)>

Recently, a scheme for simultaneously connecting UE to different base stations, for example, a macro cell base station and a small cell base station, is being studied. This is called dual connectivity (DC).

In DC, the eNodeB for the primary cell (Pcell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (Pcell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

<Next-Generation Mobile Communication Network>

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The ITU suggests three usage scenarios, for example, enhanced Mobile BroadBand (eMBB), massive Machine Type Communication (mMTC), and Ultra Reliable and Low Latency Communications (URLLC).

URLLC relates to a usage scenario in which high reliability and low delay time are required. For example, services like autonomous driving, automation, and virtual realities requires high reliability and low delay time (for example, 1 ms or less). A delay time of the current 4G (LTE) is statistically 21-43 ms (best 10%), 33-75 ms (median). Thus, the current 4G (LTE) is not sufficient to support a service requiring a delay time of 1 ms or less. Next, eMBB relates to a usage scenario in which an enhanced mobile broadband is required.

That is, the fifth-generation mobile communication system aims to achieve a capacity higher than the current 4G LTE and is capable of increasing a density of mobile broadband users and support Device-to-Device (D2D), high stability, and Machine Type Communication (MTC). Researches on 5G aims to achieve reduced waiting time and less batter consumption, compared to a 4G mobile communication system, in order to implement the IoT. For the 5G mobile communication, a new radio access technology (New RAT or NR) may be proposed.

Figure 4A:
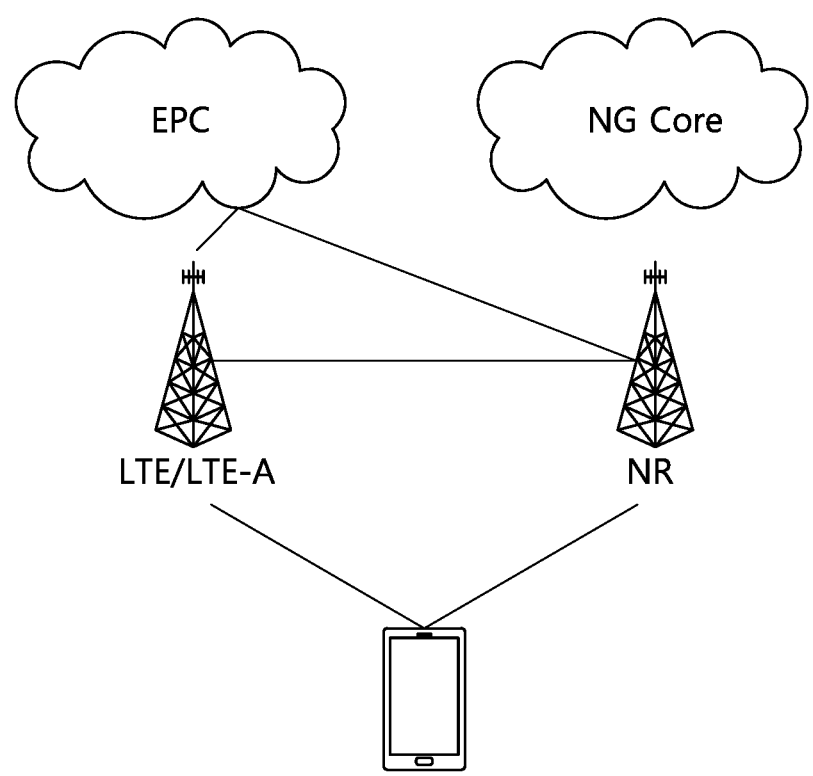
FIGS. 4A to 4C are diagrams illustrating exemplary architecture for a service of the next-generation mobile communication.
Figure 4B:
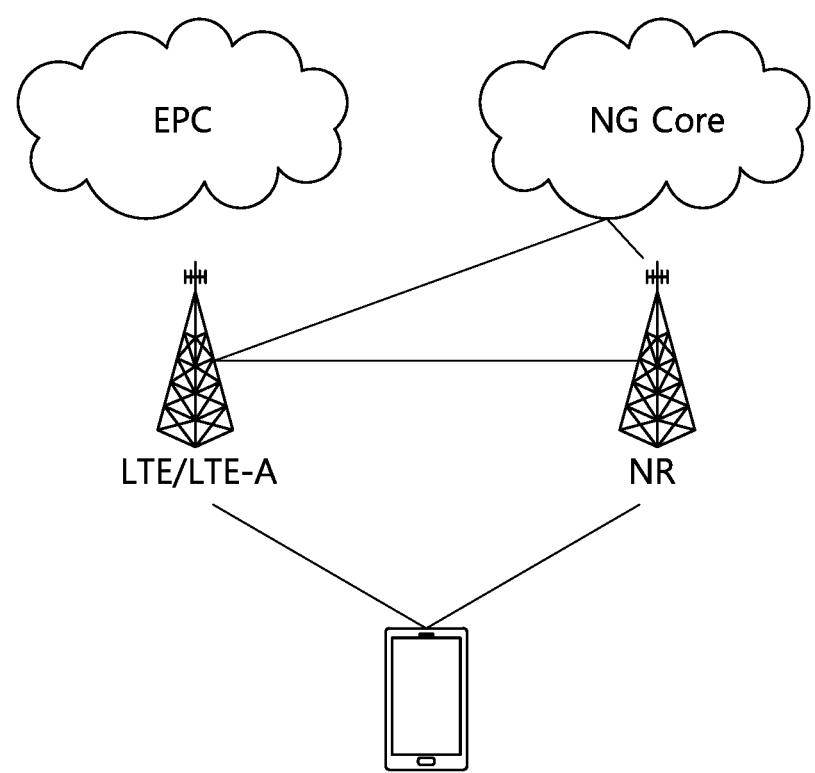
Figure 4C:
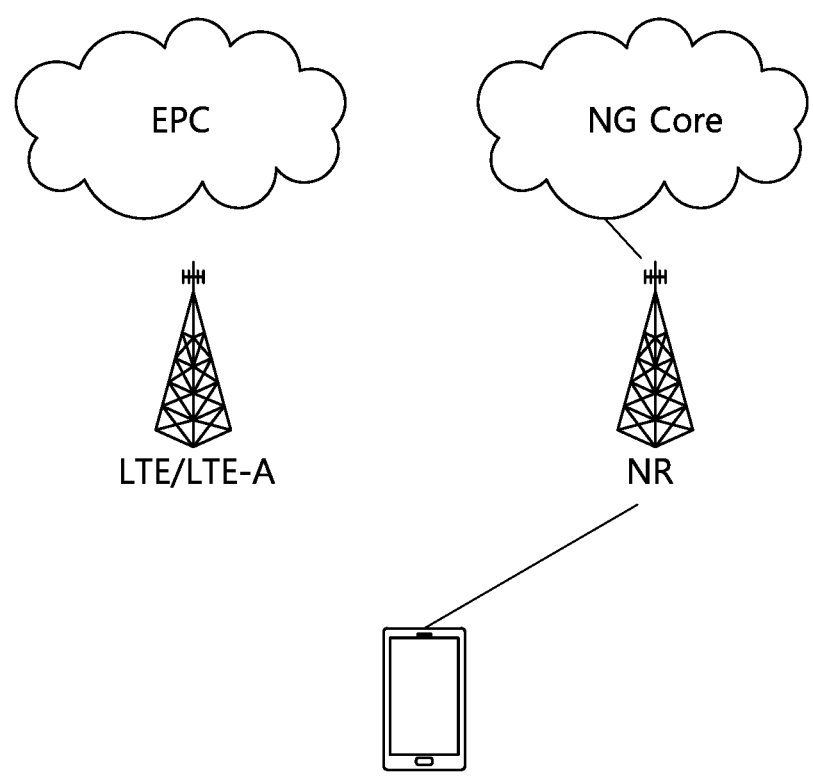

FIGS. 4A to 4C are diagrams illustrating exemplary architecture for a next-generation mobile communication service.

Referring to FIG. 4A, a UE is connected in dual connectivity (DC) with an LTE/LTE-A cell and a NR cell.

The NR cell is connected with a core network for the legacy fourth-generation mobile communication, that is, an Evolved Packet core (EPC).

Referring to FIG. 4B, the LTE/LTE-A cell is connected with a core network for 5th generation mobile communication, that is, a Next Generation (NG) core network, unlike the example in FIG. 4A.

A service based on the architecture shown in FIGS. 4A and 4B is referred to as a non-standalone (NSA) service.

Referring to FIG. 4C, a UE is connected only with an NR cell. A service based on this architecture is referred to as a standalone (SA) service.

Meanwhile, in the above new radio access technology (NR), using a downlink subframe for reception from a base station and using an uplink subframe for transmission to the base station may be considered. This method may be applied to paired spectrums and not-paired spectrums. A pair of spectrum indicates including two subcarrier for downlink and uplink operations. For example, one subcarrier in one pair of spectrum may include a pair of a downlink band and an uplink band.

Figure 5:
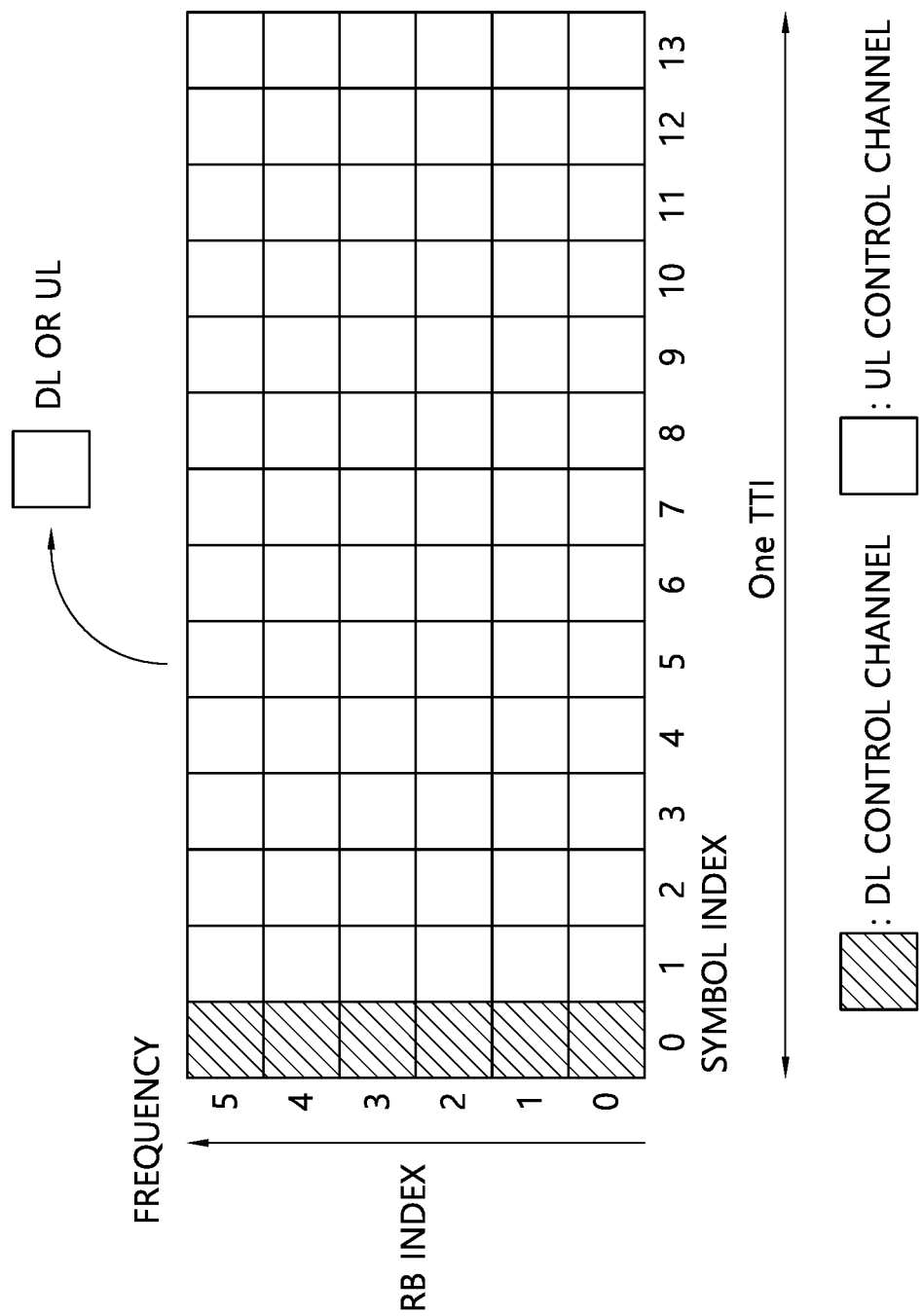
FIG. 5 illustrates an example of a subframe type in NR.

FIG. 5 shows an example of subframe type in NR.

A transmission time interval (TTI) shown in FIG. 5 may be called a subframe or slot for NR (or new RAT). The subframe (or slot) in FIG. 5 may be used in a TDD system of NR (or new RAT) to minimize data transmission delay. As shown in FIG. 4, a subframe (or slot) includes 14 symbols as does the current subframe. A front symbol of the subframe (or slot) may be used for a downlink control channel, and a rear symbol of the subframe (or slot) may be used for a uplink control channel. Other channels may be used for downlink data transmission or uplink data transmission. According to such structure of a subframe (or slot), downlink transmission and uplink transmission may be performed sequentially in one subframe (or slot). Therefore, a downlink data may be received in the subframe (or slot), and a uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by µ, a subcarrier spacing and a corresponding CP length may be expressed as shown in the following table.

TABLE 5

| M | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by µ, the number of OLDM symbols per slot $N^{slot}_{symb}$, the number of slots per frame Nframe,µslot, and the number of slots per subframe Nsubframe,µslot are expressed as shown in the following table.

TABLE 6

| µ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by µ, the number of OLDM symbols per slot $N^{slot}_{symb}$, the number of slots per frame Nframe,µslot, and the number of slots per subframe Nsubframe,µslot are expressed as shown in the following table.

TABLE 7

| M | $N^{slot}_{symb}$ | $N^{frame,\mu}_{slot}$ | $N^{subframe,\mu}_{slot}$ |
|---|---|---|---|
| 2 | 12 | 40 | 4 |

Meanwhile, in the next-generation mobile communication, each symbol may be used for downlink or uplink, as shown in the following table. In the following table, uplink is indicated by U, and downlink is indicated by D. In the following table, X indicates a symbol that can be flexibly used for uplink or downlink.

TABLE 8

| For-mat | Symbol Number in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |

TABLE 8-continued

| For-mat | Symbol Number in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | U | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | X | X | X | U | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | X | X | X | X | X | X | X | X | U |
| 45 | D | D | D | D | D | X | X | U | U | U | U | U | U | U |
| 46 | D | D | D | D | D | X | D | D | D | D | D | D | D | X |
| 47 | D | D | D | D | X | X | D | D | D | D | D | D | X | X |
| 48 | D | D | X | X | X | X | D | D | X | X | X | X | X | X |
| 49 | D | X | X | X | X | X | D | X | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | D | X | U | D | D | D | D | D | X | X | U |
| 55 | D | D | X | U | U | U | D | X | U | U | U | U | U | U |
| 56 | D | X | U | U | U | U | D | X | U | U | U | U | U | U |
| 57 | D | D | D | X | X | U | D | D | D | X | X | X | X | U |
| 58 | D | D | X | X | U | U | D | D | X | X | U | U | U | U |
| 59 | D | X | X | U | U | U | D | X | X | U | U | U | U | U |
| 60 | D | X | X | X | X | U | D | X | X | X | X | X | X | U |
| 61 | D | D | X | X | X | U | D | D | X | X | X | X | X | U |

<Operating Band in NR>

An operating band in NR is as follows.

An operating band shown in Table 9 is a reframing operating band that is transitioned from an operating band of LTE/LTE-A. This operating band is referred to as FR1 band.

TABLE 9

| NR operating band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n50 | 1432 MHz-1517 MHz | 1432 MHz-1517 MHz | TDD1 |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |

The following table shows an NR operating band defined at high frequencies. This operating band is referred to as FR2 band.

TABLE 10

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |

Meanwhile, when the operating band shown in the above table is used, a channel bandwidth is used as shown in the following table.

TABLE 11

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

In the above table, SCS indicates a subcarrier spacing. In the above table, NRB indicates the number of RBs.

Meanwhile, when the operating band shown in the above table is used, a channel bandwidth is used as shown in the following table.

TABLE 12

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

<SS Block in NR>

In the 5G NR, information required for a UE to perform an initial access, that is, a Physical Broadcast Channel (PBCH) including a Master Information Block (MIB) and a synchronization signal (SS) (including PSS and SSS) are defined as an SS block. In addition, a plurality of SS blocks may be grouped and defined as an SS burst, and a plurality of SS bursts may be grouped and defined as an SS burst set. It is assumed that each SS block is beamformed in a particular direction, and various SS blocks existing in an SS burst set are designed to support UEs existing in different directions.

Figure 6:
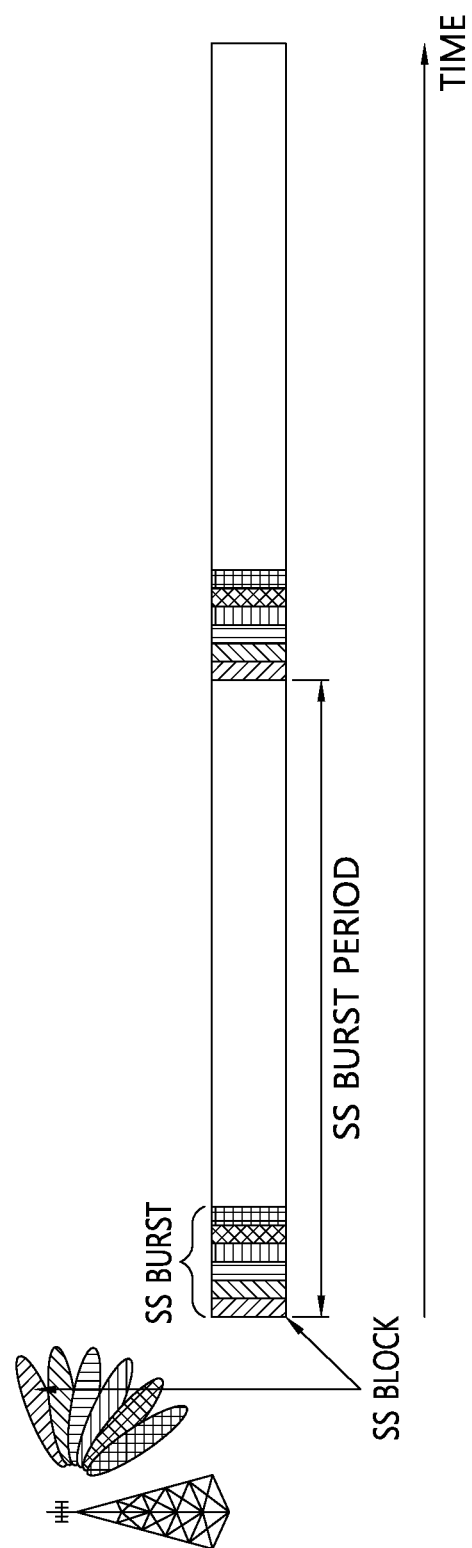
FIG. 6 illustrates an example of an SS block in NR.

FIG. 6 is a diagram illustrating an example of an SS block in NR.

Referring to FIG. 6, an SS burst is transmitted in every predetermined periodicity. Accordingly, a UE receives SS blocks, and performs cell detection and measurement.

Meanwhile, in the 5G NR, beam sweeping is performed on an SS. A detailed description thereof will be provided with reference to FIG. 7.

Figure 7:
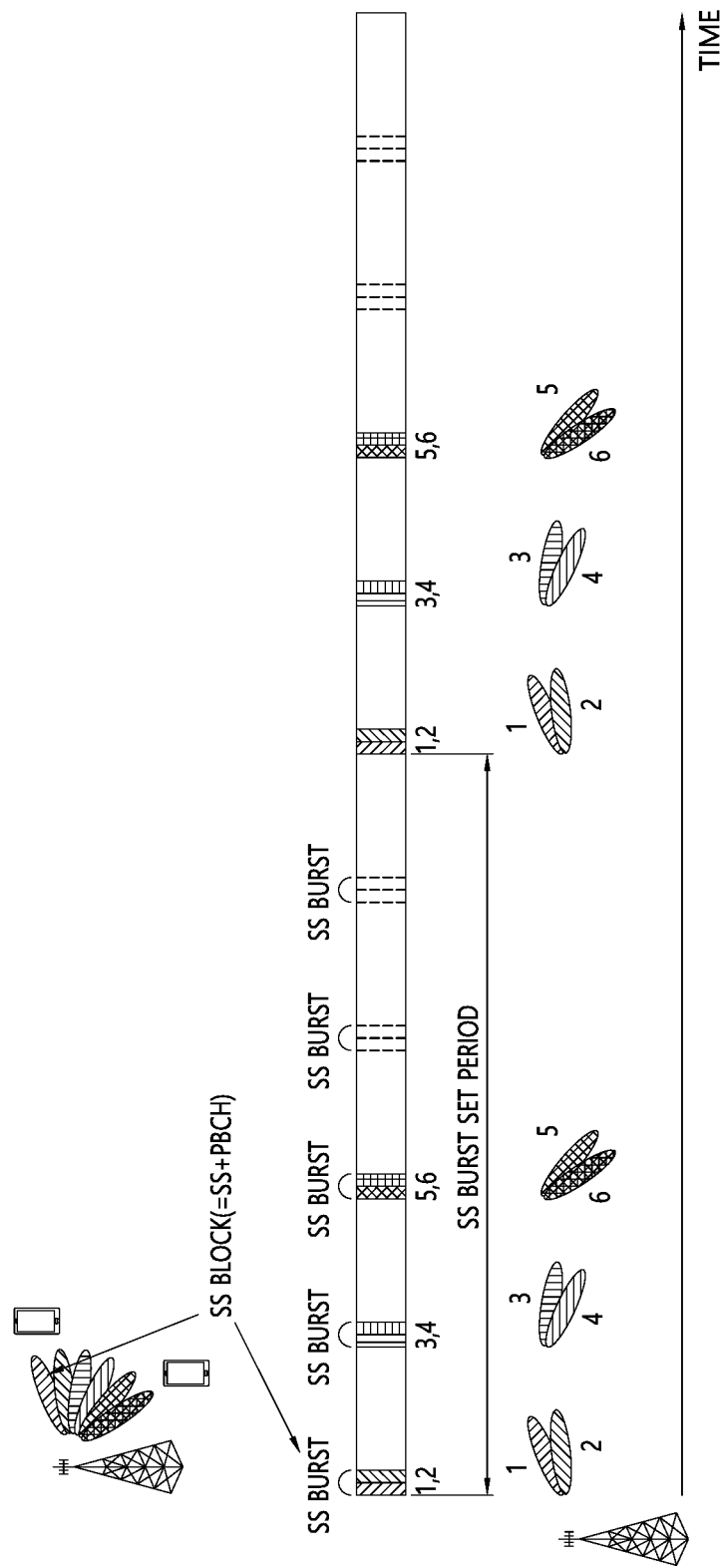
FIG. 7 illustrates an example of beam sweeping in NR.

FIG. 7 is a diagram illustrating an example of beam sweeping in the NR.

A base station transmits each SS block in an SS burst over time while performing beam sweeping. In this case, multiple SS blocks in an SS burst set are transmitted to support UEs existing in different directions. In FIG. 6, the SS burst set includes one to six SS blocks, and each SS burst includes two SS blocks.

Figure 8:
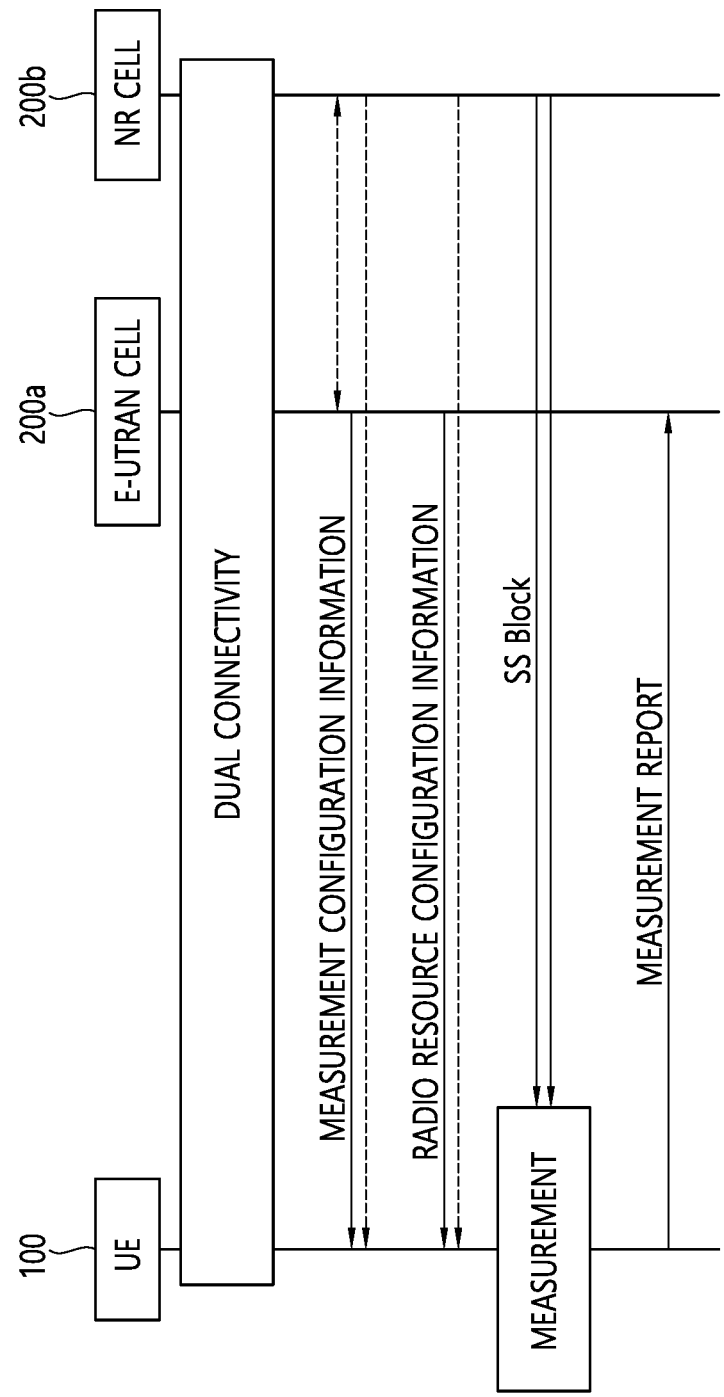
FIG. 8 illustrates an example of performing measurement in an EN (E-UTRAN and NR)-DC case.

FIG. 8 shows an example of performing measurement in EN (E-UTRAN and NR) DC case.

Referring to FIG. 8, the UE 100 are connected in EN-DC with an E-UTRAN (that is, LTE/LTE-A) cell. Here, a Pcell in EN-DC may be an E-UTRAN (that is, LTE/LTE-A) cell, and a PSCell in EN-DC may be an NR cell.

The UE 100 may receive measurement configuration (or "measconfig") information element (IE) of the E-UTRAN (that is, LTE/LTE-A) cell. The measurement configuration (or "measconfig") IE received from the E-UTRAN (that is, LTE/LTE-A) cell may further include fields shown in the following table, in addition to the fields shown in Table 2.

TABLE 13

MeasConfig field description
fr1-Gap
This field exists when a UE is configured with EN-DC.
This field indicates whether a gap is applied to perform measurement on FR1 band (that is, a band shown in Table 9).
mgta
It indicates whether to apply a timing advance (TA) of 0.5 ms for a measurement gap configuration provided by the E-UTRAN.

The measurement configuration (or "measconfig") IE may further include a measGapConfig field for setting a measurement gap (MG), as shown in Table 2.

A gapoffset field within the measGapConfig field may further include gp4, gp5, gp11 for EN-DC, in addition to the example shown in Table 3.

Meanwhile, the UE 100 may receive a measurement configuration ("measconfig") IE of an NR cell, which is a PSCell, directly from the NR cell or through the E-UTRAN cell which is a Pcell.

Meanwhile, the measurement configuration ("measconfig") IE of the NR cell may include fields as shown in the following table.

TABLE 14

MeasConfig field description
measGapConfig
It indicates configuration or cancelation of a measurement gap
s-MeasureConfig
It indicates a threshold value for measurement of NR SpCell RSRP when a UE needs to perform measurement on a non-serving cell.

The above measGapConfig may further include fields as shown in the following table.

TABLE 15

MeasGapConfig field description
gapFR2
It indicates a measurement gap configuration applicable for FR2 frequency range.
gapOffset
It indicates a gap offset of a gap pattern with an MGRP.
mgl
It indicates a measurement gap length by ms.
There may be 3 ms, 4 ms, 6 ms, etc.
mgrp
It indicates a measurement gap repetition period by ms.
mgta
It indicates whether to apply a timing advance (TA) of 0.5 ms for a measurement gap configuration.

Meanwhile, as shown in the drawing, the UE 100 receives a radio resource configuration information element (IE) of the E-UTRAN (that is, LTE/LTE-A) cell which is a Pcell. In addition, the UE may receive a radio resource configuration IE of an NR cell, which is a PSCell, from the NR cell or through the E-UTRAN cell which is a Pcell. The radio resource configuration IE includes subframe pattern information, as described above with reference to FIG. 3.

The UE 100 performs measurement and reports a measurement result. Specifically, the UE 100 interrupts data transmission and reception with the E-UTRAN (that is, LTE/LTE-A) cell during the measurement gap, retunes its own RF chain, and performs measurement based on receipt of an SS block from an NR cell.

<Disclosure of the Present Specification>

Hereinafter, the disclosure of the present specification proposes operation methods of a base station and a UE for reducing power consumption reduction of the UE during cross link interference (CLI) in a network supporting flexible duplex in 5G NR networks.

In the case of 5G NR networks, Time Division Duplex (TDD) and Frequency Division Duplex (FDD) can be used in the range of operation band FR1 (e.g., 6 GHz or lower) and TDD can be used in the range of operation band FR2 (e.g., 6 GHz or higher).

In the case of TDD, a ratio of DL to UL can be set differently by changing a DL/UL configuration in response to the amount of traffic. However, when the same frequency band or a neighboring frequency band is used, a serving cell and a neighboring cell (or including a case in which a serving cell provider differs from a neighboring cell provider) may use the same DL/UL configuration in order to minimize the influence of interference. In this case, DL/UL configuration flexibility decreases.

In the case of FDD, a DL/UL ratio cannot be changed because a DL frequency and a UL frequency are differently set irrespective of the amount of DL/UL traffic.

Accordingly, the disclosure of the present specification proposes a method of applying flexible duplex in order to increase system capacity using a DL/UL ratio in response to the amount of traffic more efficiently.

Figure 9:
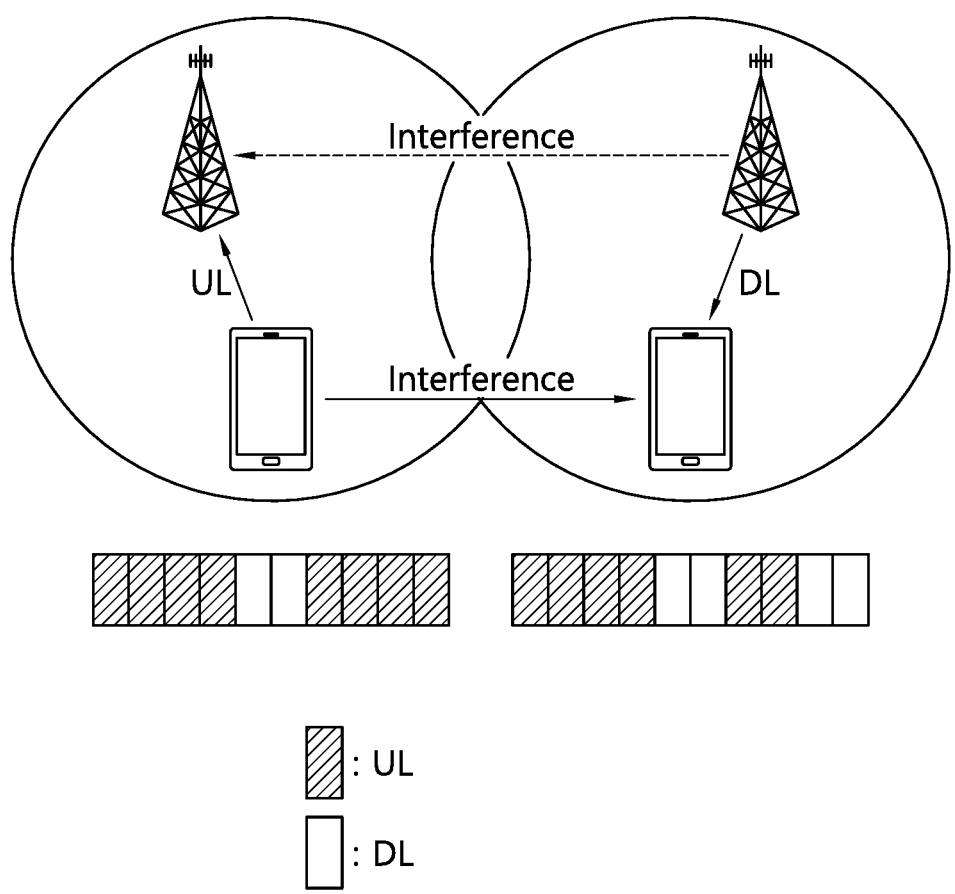
FIG. 9 shows an example of interference due to flexible duplex.

FIG. 9 illustrates an example of interference due to flexible duplex.

However, as can be ascertained from FIG. 9, interference between UEs or base stations may occur due to UL/DL between neighboring cells if a DL/UL ratio is set differently in response to the amount of traffic of each cell.

Accordingly, the disclosure of the present specification proposes a method through which a base station of each cell determines whether to flexibly change a UL/DL ratio in response to interference intensity through measurement of interference of UL/DL, that is, CLI measurement.

Specifically, the present specification proposes operation methods of a base station and a UE to reduce power consumption of the UE during CLI measurement and decrease resource overhead of a reference signal for a CLI in a network supporting flexible duplex.

To flexibly change and use a UL/DL configuration of frequency resources, methods for mitigating interference caused by a difference between a UL/DL configuration of a serving cell and a UL/DL configuration of a neighboring cell are required.

A method for achieving this is an operation method of a base station using cross link interference (CLI) measurement. That is, when a base station uses flexible duplex for each cell, a first UE of a serving cell can measure interference from a second UE of an interfering cell. When the level of the measured interference is high, the base station can stop use of flexible duplex and control UL/DL configurations such that a UL/DL configuration of a neighboring cell corresponds to a UL/DL configuration of the serving cell or control interference through power control.

To measure a CLI, the first UE of the serving cell monitors a reference signal (referred to as a CLI-RS in the present specification) transmitted from the second UE of the neighboring cell at predetermined intervals and reports a measurement value with respect to the CLI-RS to the corresponding network. The CLI-RS may be transmitted using an existing sounding reference signal (SRS) or a newly defined CSI-RS.

Different from conventional methods, to change the ratios of uplink (UL) and downlink (DL) and their order in various ways for each cell, interference due to neighboring cells has to be considered. If a UE measures interference with respect to a signal from another UE belonging to a neighboring cell and transmits the measured interference to a serving cell to consider interference from the neighboring cell, the serving cell may determine the ratios and the order of UL and DL. To measure the interference, a UE of the serving cell may measure SRS transmitted by a UE of the neighboring cell. Suppose a UE of the serving cell is denoted by a first UE, and a UE of the neighboring cell is denoted by a second UE. Since there exists a difference between downlink timing of the first UE and SRS arrival timing from the second UE, timing alignment is needed for the first UE to measure SRS from the second UE. Therefore, in what follows, a method for timing alignment will be described.

Figure 10A:
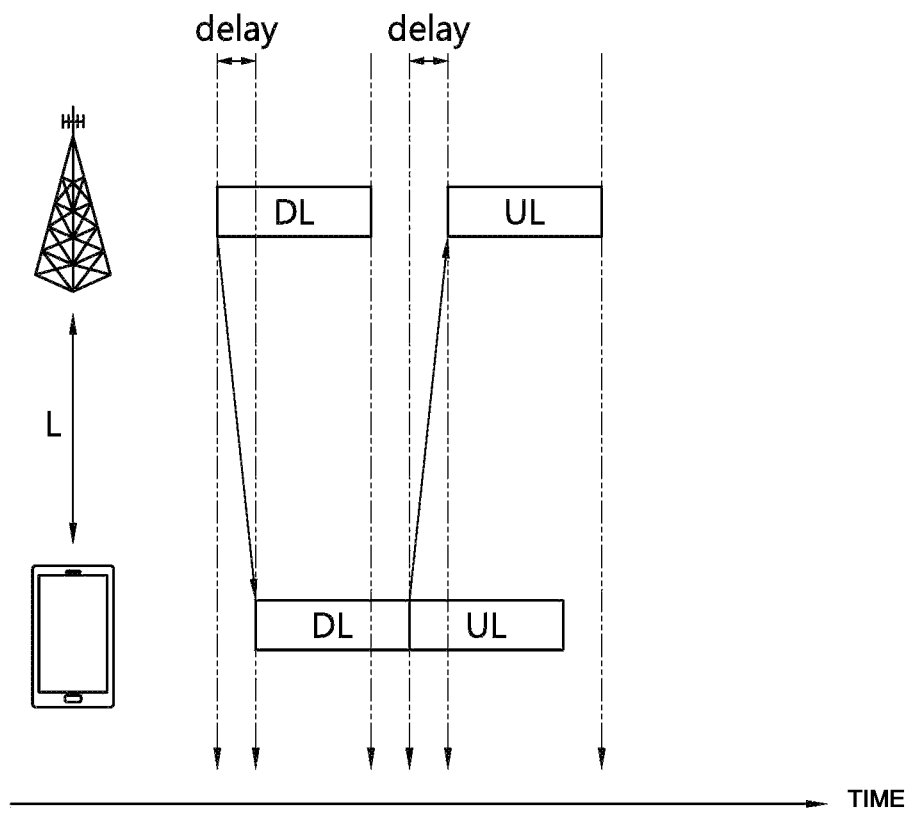
FIG. 10a illustrates one example of time delay occurred between a base station and a UE.

FIG. 10a illustrates one example of time delay occurred between a base station and a UE.

A base station and a UE communicate with each other via uplink (UP) through which the UE transmits data to the base station and via downlink (DL) through which the base station transmits data to the UE.

For communication, the Frequency Division Duplex (FDD) scheme that divides UL and DL on the frequency basis and the Time Division Duplex (TDD) scheme that divides UL and DL on the time basis are used.

In the figure shown, x-axis represents the elapsed time. Although the illustrated example is based on the TDD scheme, the example may be applied to the FDD scheme in the same manner.

If the UE transmits UL data to the base station (Tx), a delay occurs between the time the UE transmits data and the time the base station received the data. The delay value is increased in proportion to the distance between the UE and the base station, L. Therefore, depending on the UE's location, a unique delay value is determined.

The base station transmits required DL data to the UE. A delay occurs between the time the base station transmits DL data and the time the UE receives the data. To remove the delay, it is necessary to perform timing alignment. The timing alignment is called Timing Advance (TA).

Figure 10B:
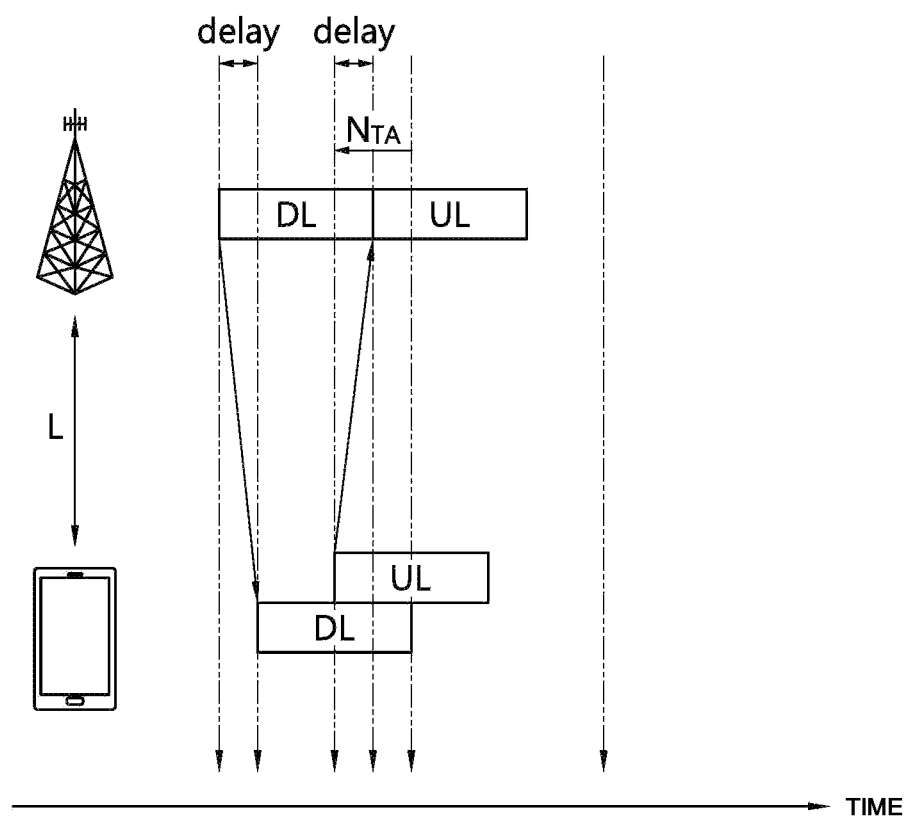

FIG. 10b illustrates one example of Timing Advance (TA) for compensating for the time delay shown in FIG. 10a.

As shown in FIG. 10b, the UE advances transmission timing of UL by as much as $N_{TA}$, where $N_{TA}$=(propagation)delay*2.

The value of $N_{TA}$ may be calculated by the base station and may be transmitted to the UE through an RRC signal or Downlink Control Information (DCI).

Figure 11:
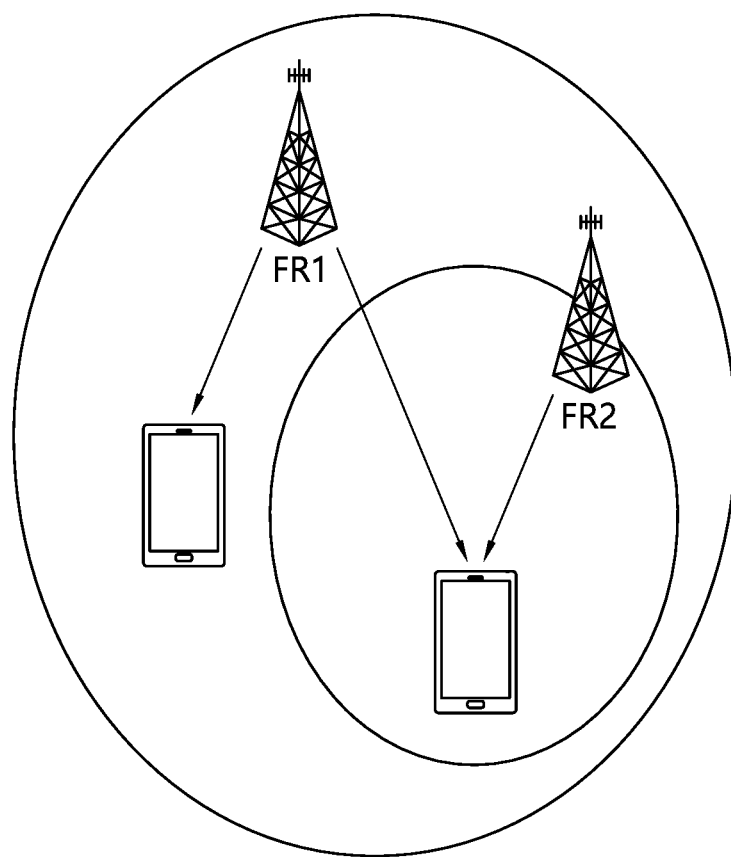
FIG. 11 illustrates a base station, a plurality of UEs, FR1 and FR2.

FIG. 11 illustrates a base station, a plurality of UEs, FR1 and FR2.

The base station exchanges data with a plurality of UEs. Depending on the frequency band of a signal through which data are exchanged, the UEs may be classified into FR1 and FR2.

FR1 is characterized as shown in Table 9, and FR2 is characterized as shown in Table 10.

$v=\lambda*f.$

Speed is proportional to the magnitude of frequency. Therefore, the time (L/v) required for transmitting and receiving a signal between a UE and the base station is inversely proportional to the magnitude of frequency.

$N_{TA\_offset}$: 13 μsec for FR1 and 7 μsec for FR2 and 20 μsec for EN-DC(TDD).

To obtain a timing difference to be described below, the frequency offset, $N_{TA\_offset}$, is determined as follows. Since the $N_{TA\_offset}$ is a compensation for frequency rather than distance, it may be used commonly for all the UEs.

Therefore, the base station may transmit the value of $N_{TA\_offset}$ to a UE through an RRC signal.

Then the UE may perform timing advance by as much as $N_{TA}+N_{TA\_offset}$ when the UE performs uplink transmission.

Meanwhile, as described above, for CLI measurement, the first UE of a serving cell has to detect an SRS from the second UE of a neighboring cell. At this time, a timing difference (or a timing error) is occurred. In what follows, the timing difference (or timing error) will be described.

Figure 12:
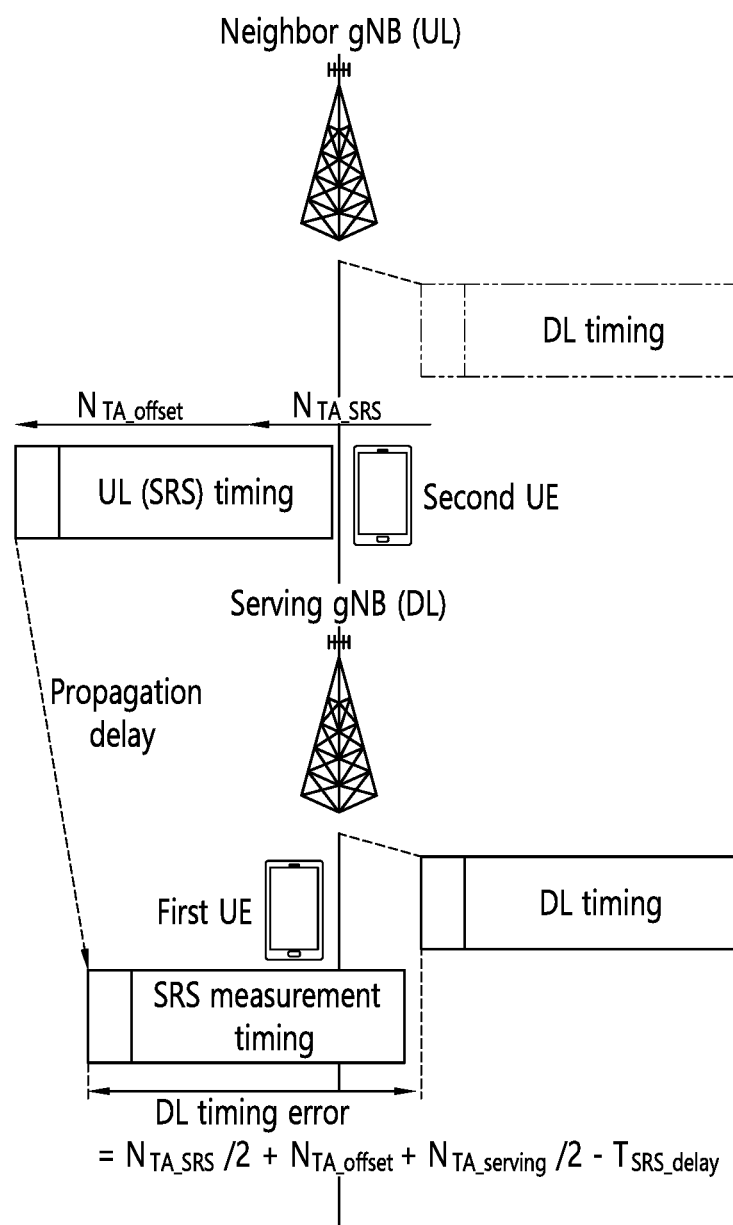
FIG. 12 illustrates a difference between downlink timing of a first UE and SRS arrival timing of a second UE.

FIG. 12 illustrates a difference between downlink timing of a first UE and SRS arrival timing of a second UE.

As shown in FIG. 12, the timing difference is obtained by adding all of the offset due to the first UE's location, $N_{TA\_serving}/2$, the offset due to the second UE's location, $N_{TA\_SRS}/2$, and the offset due to the frequency band employed, $N_{TA\_offset}$; and by subtracting the time that an SRS of the second UE arrives at the first UE, $T_{SRS\_delay}$.

In other words, the timing difference is determined as $N_{TA\_SRS}/2+N_{TA\_offset}+N_{TA\_serving}/2-T_{SRS\_delay}$. The first UE may perform timing advance by as much as the timing difference to detect an SRS.

Therefore, by measuring the SRS of a UE of a neighboring cell, interference may be measured, and UL/DL may be determined dynamically.

Figure 13:
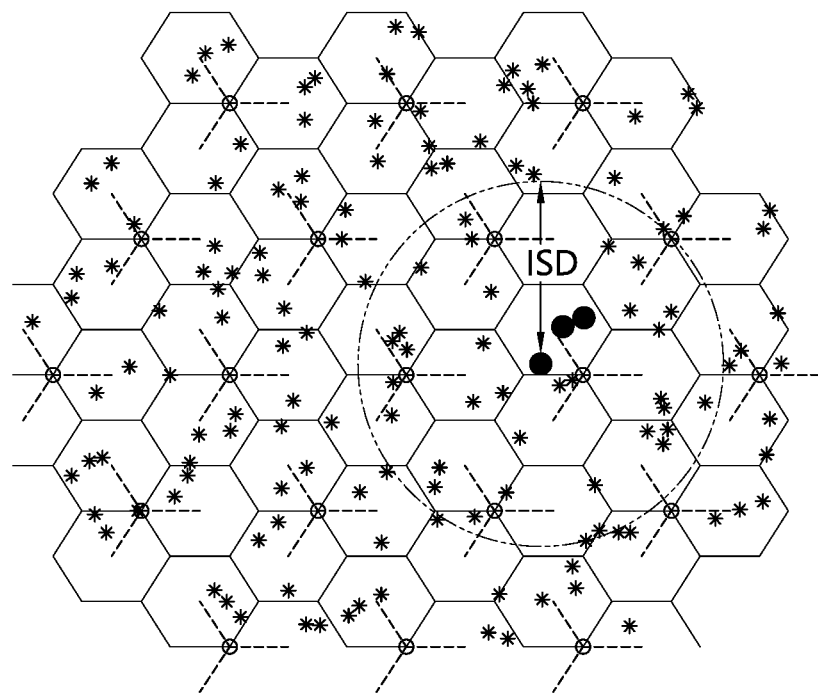
FIG. 13 illustrates locations of a first UE and a second UE.

FIG. 13 illustrates locations of a first UE and a second UE.

Locations of a second UE transmitting an SRS and a first UE measuring the SRS vary. The second UE located at the edge area of a cell transmits an SRS with transmission power greater than that transmitted by a UE near a base station. Therefore, when the first UE and the second UE are located at the edge area of a cell, the highest signal interference is received. Therefore, the case where a UE is located in the edge area has to be considered.

FIG. 14 illustrates a timing difference due to location and frequency.

In the figure, x-axis corresponds to time, and y-axis corresponds to a Cumulative Distribution Function (CDF). Since the range [⅔*R, R] where a UE is located in the edge area of a cell exhibits larger signal interference than the range [0, R] at the same CDF value, a longer timing difference is developed. In this way, depending on where the UE is located, various timing differences may result. Furthermore, since speed of a signal is faster at higher frequency, a smaller timing difference is obtained.

As described above, the timing difference may differ greatly depending on the distance between the second UE transmitting an SRS and the first UE detecting the SRS, the radius from a cell to each UE, and the frequency band employed. Therefore, it is practically impossible to calculate an accurate value of the timing difference by considering all the possible situations.

For this DL measurement timing error, it is not possible to track all DL measurement timing error since there will be several UE transmitting SRSs in neighbor cell.

Therefore, the Rx timing for UE receiving SRS may be adjusted using constant offset value range 11.5~13.5 psec for FR1 and 6.4~7.2 μsec for FR2 roughly.

In other words, it may be effective to use the timing difference calculated by assuming a specific situation.

The UE capable of performing CLI measurements shall be able to measure SRS-RSRP and CLI-RSSI within active DL BWP. The measurements requirements in this clause apply for TDD mode only.

When the UE measures SRS-RSRP and CLI-RSSI, a constant offset value to compensate reception timing error between downlink reference timing in the serving cell and SRS arrival timing from the neighbour cell shall be applied. The constant offset value is used to compensate at least $N_{TA\_offset}$ in the timing error.

The SRS-RSRP measurement reported by the UE shall fulfil the accuracy requirements as follows:

The time difference between UE's DL reference timing in the serving cell and SRS arrival time is no larger than $T_{error\_SRS\_RSRP}$, where $T_{error\_SRS\_RSRP}=T_C \times N_{TA\_offset}+$a constant for FR1

$T_{error\_SRS\_RSRP}=T_C \times N_{TA\_offset}+$a constant for FR2

$T_C$ is 0.509 ns

The above-described embodiments of the present disclosure may be implemented by use of various means. For example, the embodiments of the present disclosure may be implemented by hardware, firmware, and software or a combination thereof. A detailed description thereof will be provided with reference to drawings.

Figure 15:
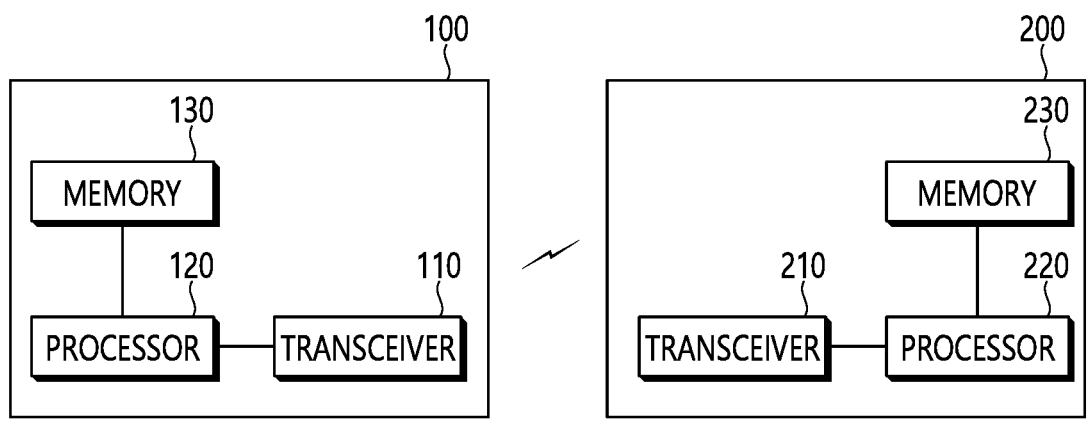
FIG. 15 is a block diagram illustrating a wireless device and a base station, by which the disclosure of this specification can be implemented.

FIG. 15 is a block diagram illustrating a wireless device and a base station, by which the disclosure of this specification can be implemented.

Referring to FIG. 15, a wireless device 100 and a base station 200 may implement the disclosure of this specification.

The wireless device 100 includes a processor 101, a memory 102, and a transceiver 103. Likewise, the base station 200 includes a processor 201, a memory 202, and a transceiver 203. The processors 101 and 201, the memories 102 and 202, and the transceivers 103 and 203 may be implemented as separate chips, or at least two or more blocks/functions may be implemented through one chip.

Each of the transceivers 103 and 203 includes a transmitter and a receiver. When a particular operation is performed, either or both of the transmitter and the receiver may operate. Each of the transceivers 103 and 203 may include one or more antennas for transmitting and/or receiving a radio signal. In addition, each of the transceivers 103 and 203 may include an amplifier configured for amplifying a Rx signal and/or a Tx signal, and a band pass filter for transmitting a signal to a particular frequency band.

Each of the processors 101 and 201 may implement functions, procedures, and/or methods proposed in this specification. Each of the processors 101 and 201 may include an encoder and a decoder. For example, each of the processors 101 and 202 may perform operations described above. Each of the processors 101 and 201 may include an application-specific integrated circuit (ASIC), a different chipset, a logic circuit, a data processing device, and/or a converter which converts a base band signal and a radio signal into each other.

Each of the memories 102 and 202 may include a Read-Only Memory (ROM), a Random Access Memory (RAM), a flash memory, a memory card, a storage medium, and/or any other storage device.

Figure 16:
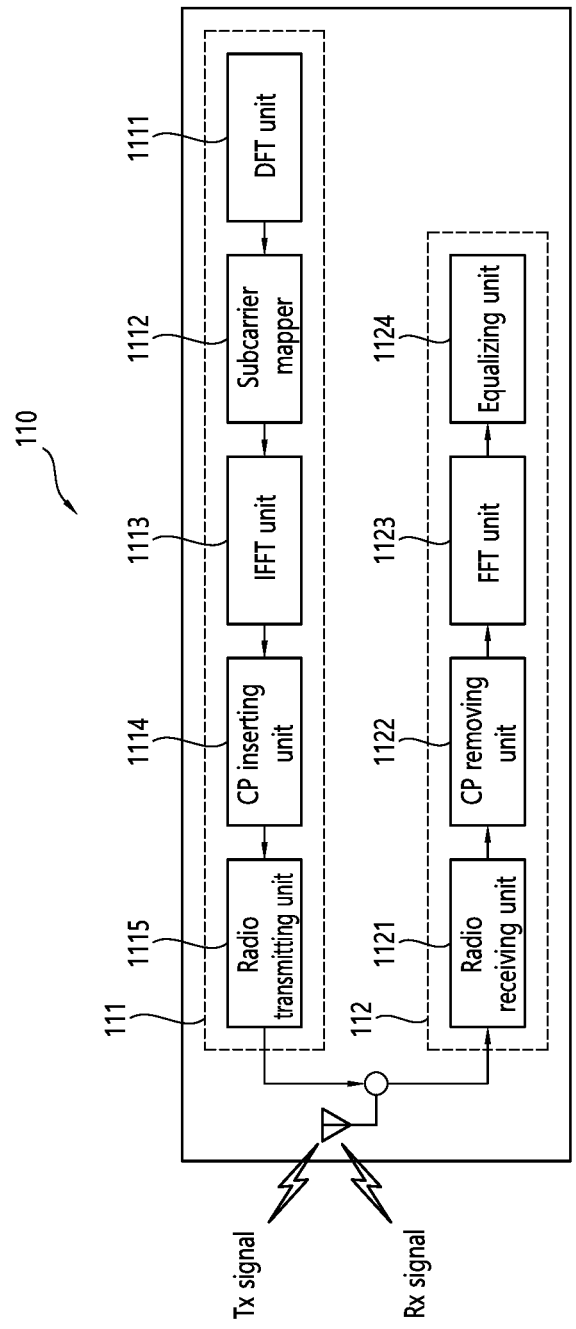
FIG. 16 is a detailed block diagram illustrating a transceiver of the wireless device shown in FIG. 15.

FIG. 16 is a detailed block diagram illustrating a transceiver of the wireless device shown in FIG. 15.

Referring to FIG. 16, a transceiver 110 includes a transmitter 111 and a receiver 112. The transmitter 111 includes a Discrete Fourier Transform (DFT) unit 1111, a subcarrier mapper 1112, an IFFT unit 1113, a CP insertion unit 1114, a wireless transmitter 1115. In addition, the transceiver 1110 may further include a scramble unit (not shown), a modulation mapper (not shown), a layer mapper (not shown), and a layer permutator, and the transceiver 110 may be disposed in front of the DFT unit 1111. That is, in order to prevent a peak-to-average power ratio (PAPR) from increasing, the transmitter 111 may transmit information to pass through the DFT unit 1111 before mapping a signal to a subcarrier. A signal spread (or pre-coded for the same meaning) by the DFT unit 111 is subcarrier-mapped by the subcarrier mapper 1112, and then generated as a time domain signal by passing through the IFFT unit 1113.

The DFT unit 111 performs DFT on input symbols to output complex-valued symbols. For example, if Ntx symbols are input (here, Ntx is a natural number), a DFT size may be Ntx. The DFT unit 1111 may be called a transform precoder. The subcarrier mapper 1112 maps the complex-valued symbols to subcarriers of a frequency domain. The complex-valued symbols may be mapped to resource elements corresponding to a resource block allocated for data transmission. The subcarrier mapper 1112 may be called a resource element mapper. The IFFT unit 113 may perform IFFT on input symbols to output a baseband signal for data, which is a time-domain signal. The CP inserter 1114 copies a rear portion of the baseband signal for data and inserts the copied portion into a front part of the baseband signal. The CP insertion prevents Inter-Symbol Interference (ISI) and Inter-Carrier Interference (ICI), and therefore, orthogonality may be maintained even in multi-path channels.

Meanwhile, the receiver 112 includes a wireless receiver 1121, a CP remover 1122, an FFT unit 1123, and an equalizer 1124, and so on. The wireless receiver 1121, the CP remover 1122, and the FFT unit 1123 of the receiver 112 performs functions inverse to functions of the wireless transmitter 1115, the CP inserter 1114, and the IFFT unit 113 of the transmitter 111. The receiver 112 may further include a demodulator.

An example in which a disclosure of the present specification can be utilized will be described as follows.

<General Description on Device to which Disclosure of the Present Specification is Applicable>

Hereinafter, a device to which the present disclosure is applicable will be described.

Figure 17:
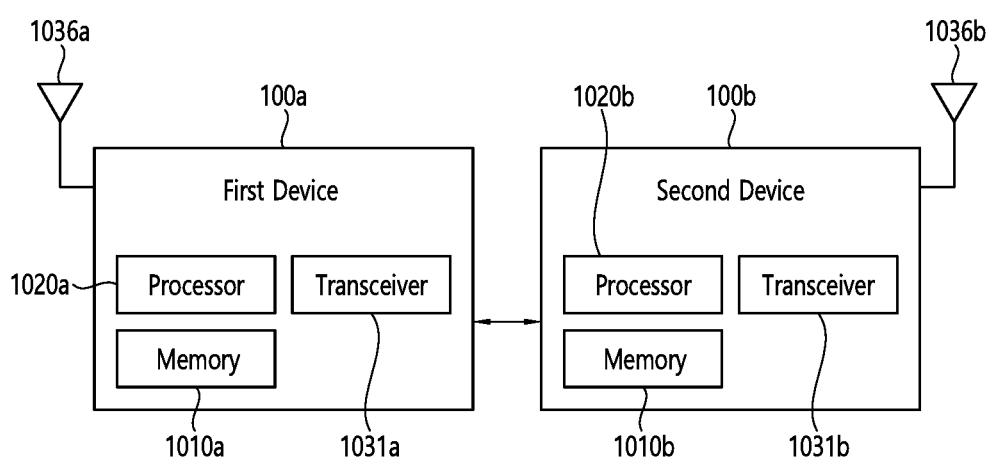
FIG. 17 shows a wireless communication system according to an embodiment.

FIG. 17 shows a wireless communication system according to an embodiment.

Referring to FIG. 17, a wireless communication system may include a first device 100a and a second device 100b.

The first device 100a may be a base station, a network node, a transmitting terminal, a receiving terminal, a wireless device, a wireless communication device, a vehicle, a vehicle equipped with self-driving capability, a connected car, a drone (or an unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a climate/environment device, a device related to a 5G service, or a device related to a field of the 4th industrial revolution.

The second device 100b may be a base station, a network node, a transmitting terminal, a receiving terminal, a wireless device, a wireless communication device, a vehicle, a vehicle equipped with self-driving capability, a connected car, a drone (or an unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a climate/environment device, a device related to a 5G service, or a device related to a field of the 4th industrial revolution.

For example, a terminal may include a mobile phone, a smart phone, a laptop computer, a digital broadcasting terminal, a personal digital assistants (PDA), a portable multimedia player (PMP), a navigation, a slate PC, a table PC, an ultrabook, a wearable device (e.g., a smartwatch, a smart glass, a head mounted display (HMD)), or the like. For example, the HMD may be a display device worn on a head. For example, the HMD may be used to implement VR, AR, or MR.

For example, the drone may be an unmanned aerial vehicle which flies by using a radio control signal. For example, the VR device may include a device for realizing an object, background, or the like of a virtual world. For example, the AR device may include a device for realizing an object or background of a virtual world by connecting with an object or background or the like of a real world. For example, the MR device may include a device for realizing an object or background of a virtual world by merging an object, background, or the like of a real world. For example, the hologram device may include a device for recording and reproducing stereoscopic information to realize a 360-degree stereoscopic image, by utilizing light interference which occurs when two laser beams called holography are met. For example, the public safety device may include an image relay device or an image device or the like which can be worn on a user's body. For example, the MTC device and the IoT device may be devices not requiring direct human intervention or manipulation. For example, the MTC device and the IoT device may include a smart meter, a bending machine, a thermometer, a smart bulb, a door lock, or various sensors. For example, the medical device may be a device used for diagnosing, curing, alleviating, treating, or preventing a disease. For example, the medial device may be a device used for diagnosing, curing, alleviating or ameliorating an injury or disorder. For example, the medial device may be a device used for inspecting, replacing, or modifying a structure or function. For example, the medical device may be a device used for controlling pregnancy. For example, the medical device may include a diagnostic device, a surgical device, a (in vitro) diagnostic device, a hearing aid, or a treatment device. For example, the security device may be a device installed to prevent potential hazards and maintain security. For example, the security device may be a camera, a CCTV, a recorder, or a black box. For example, the Fin-Tech device may be a device capable of providing financial services such as mobile payment. For example, the Fin-tech device may include a payment device or a point of sales (POS). For example, the climate/environmental device may include a device for monitoring or predicting climates/environments.

The first device 100a may include at least one processor such as a processor 1020a, at least one memory such as a memory 1010a, and at least one transceiver such as a transceiver 1031a. The processor 1020a may perform the aforementioned functions, procedures, and/or methods. The processor 1020a may perform one or more protocols. For example, the processor 1020a may perform one or more layers of a radio interface protocol. The memory 1010a may be coupled to the processor 1020a, and may store various types of information and/or commands. The transceiver 1031a may be coupled to the processor 1020a, and may be controlled to transmit/receive a radio signal.

The second device 100b may include at least one processor such as a processor 1020b, at least one memory such as a memory 1010b, and at least one transceiver such as a transceiver 1031b. The processor 1020b may perform the aforementioned functions, procedures, and/or methods. The processor 1020b may perform one or more protocols. For example, the processor 1020b may perform one or more layers of a radio interface protocol. The memory 1010b may be coupled to the processor 1020b, and may store various types of information and/or commands. The transceiver 1031b may be coupled to the processor 1020b, and may be controlled to transmit/receive a radio signal.

The memory 1010a and/or the memory 1010b may be connected internally or externally to the processor 1020a and/or the processor 1020b, respectively, or may be connected to other processors through various techniques such as wired or wireless connections.

The first device 100a and/or the second device 100b may have one or more antennas. For example, an antenna 1036a and/or an antenna 1036b may be configured to transmit/receive a radio signal.

Figure 18:
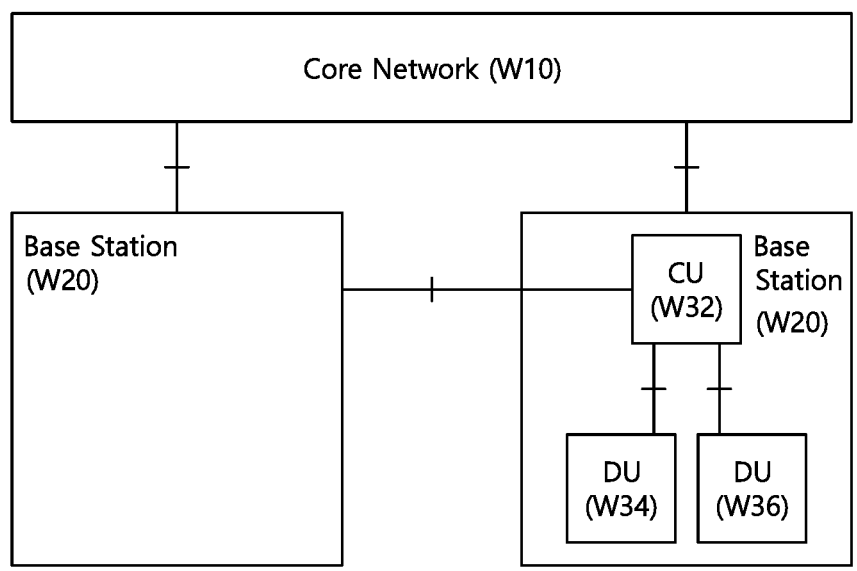
FIG. 18 is a block diagram of a network node according to an embodiment.

FIG. 18 is a block diagram of a network node according to an embodiment.

In particular, FIG. 18 shows an example of the network node of FIG. 17 in greater detail, when a base station is divided into a central unit (CU) and a distributed unit (DU).

Referring to FIG. 18, base stations W20 and W30 may be connected to a core network W10, and the base station W30 may be connected to the neighboring base station W20. For example, an interface between the base stations W20 and W30 and the core network W10 may be referred to as NG, and an interface between the base station W30 and the neighboring base station W20 may be referred to as Xn.

The base station W30 may be divided into a CU W32 and DUs W34 and W36. That is, the base station W30 may be managed by being separated in a layered manner. The CU W32 may be connected to one or more DUs W34 and W36. For example, an interface between the CU W32 and the DUs W34 and W36 may be referred to as F1. The CU W32 may perform a function of higher layers of the base station, and the DUs W34 and W36 may perform a function of lower layers of the base station. For example, the CU W32 may be a logical node for hosting radio resource control (RRC), service data adaptation protocol (SDAP), and packet data convergence protocol (PDCP) layers of the base station (e.g., gNB), and the DUs W34 and W36 may be a logical node for hosting radio link control (RLC), media access control (MAC), and physical (PHY) layers of the base station. Alternatively, the CU W32 may be a logical node for hosting RRC and PDCP layers of the base station (e.g., en-gNB).

Operations of the DUs W34 and W36 may be partially controlled by the CU W32. One DU W34 or W36 may support one or more cells. One cell may be supported only by one DU W34 or W36. One DU W34 or W36 may be connected to one CU W32, and one DU W34 or W36 may be connected to a plurality of CUs by proper implementation.

Figure 19:
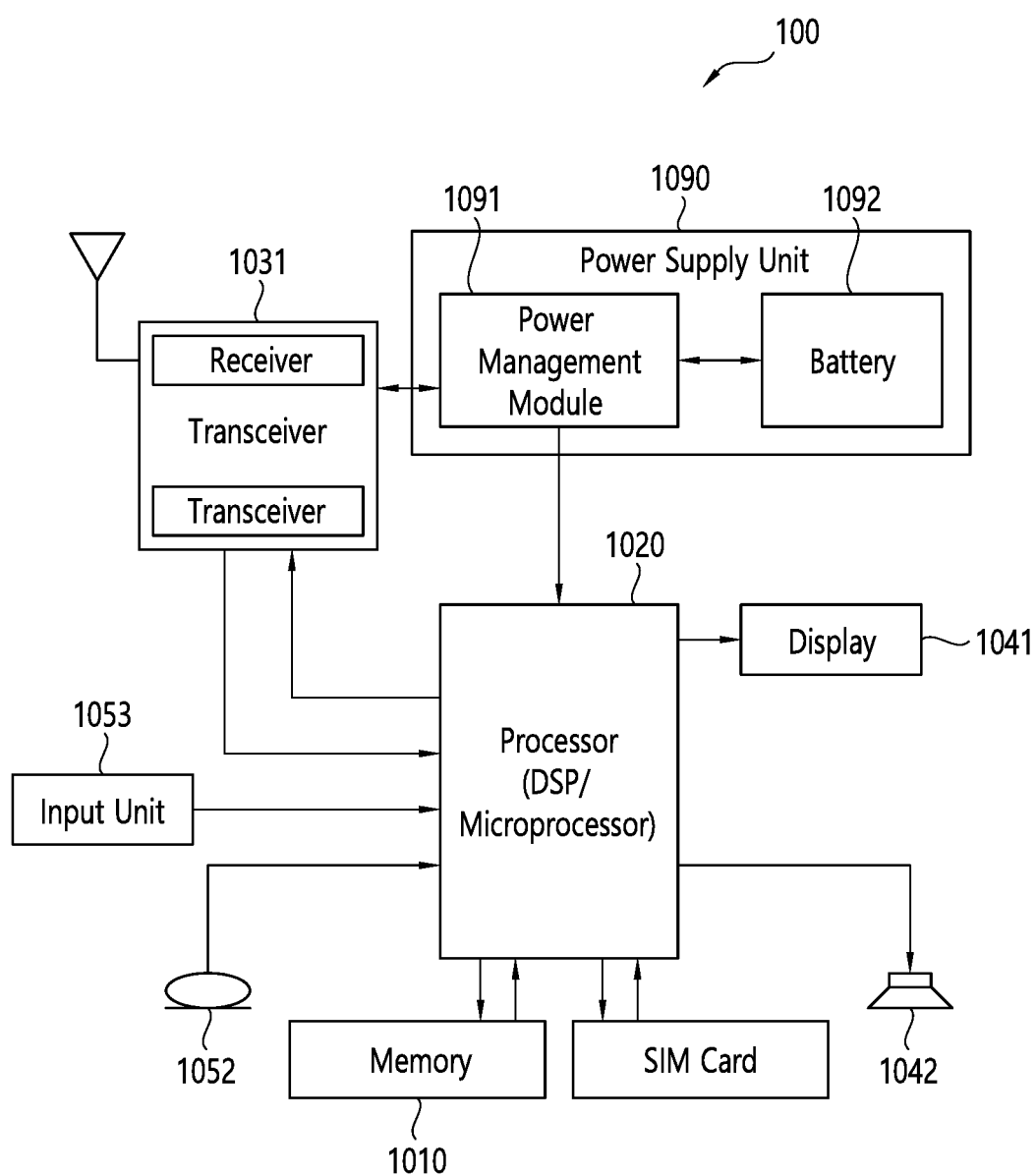
FIG. 19 is a block diagram showing a structure of a terminal according to an embodiment.

FIG. 19 is a block diagram showing a structure of a terminal according to an embodiment.

In particular, FIG. 19 shows an example of the terminal of FIGS. 16 and 18 in greater detail.

A terminal includes a memory 1010, a processor 1020, a transceiver 1031, a power management module 1091, a battery 1092, a display 1041, an input unit 1053, a speaker 1042, a microphone 1052, a subscriber identification module (SIM) card, and one or more antennas.

The processor 1020 may be configured to implement the proposed functions, procedures, and/or methods described in the present specification. Layers of a radio interface protocol may be implemented in the processor 1020. The processor 1020 may include application-specific integrated circuits (ASICs), other chipsets, logic circuits, and/or data processing units. The processor 1020 may be an application processor (AP). The processor 1020 may include at least one of a digital signal processor (DSP), a central processing unit (CPU), a graphics processing unit (GPS), and a modulator and demodulator (modem). An example of the processor 1020 may include an SNAPDRAGON™ series processor manufactured by Qualcomm®, an EXYNOS™ series processor manufactured by Samsung®, an A series processor manufactured by Apple®, a HELIO™ series processor manufactured by MediaTek®, an ATOM™ series processor manufactured by INTEL®, or a corresponding next-generation processor.

The power management module 1091 manages power for the processor 1020 and/or the transceiver 1031. The battery 1092 supplies power to the power management module 1091. The display 1041 outputs a result processed by the processor 1020. The input unit 1053 receives an input to be used by the processor 1020. The input unit 1053 may be displayed on the display 1041. The SIM card is an integrated circuit used to safely store an international mobile subscriber identity (IMSI) used to identify and authenticate a subscriber and a key related thereto in a portable phone and a portable phone device such as a computer. Contacts information may be stored in many SIM cards.

The memory 1010 is operatively coupled to the processor 1020, and stores a variety of information for operating the processor 1020. The memory 1010 may include a read-only memory (ROM), a random access memory (RAM), a flash memory, a memory card, a storage medium, and/or other equivalent storage devices. When the embodiment is implemented in software, the techniques explained in the present specification can be implemented with a module (i.e., procedure, function, etc.) for performing the functions explained in the present specification. The module may be stored in the memory 1010 and may be performed by the processor 1020. The memory 1010 may be implemented inside the processor 1020. Alternatively, the memory 1010 may be implemented outside the processor 1020, and may be coupled to the processor 1020 in a communicable manner by using various well-known means.

The transceiver 1031 is operatively coupled to the processor 1020, and transmits and/or receives a radio signal. The transceiver 1031 includes a transmitter and a receiver. The transceiver 1031 may include a baseband signal for processing a radio frequency signal. The transceiver controls one or more antennas to transmit and/or receive a radio signal. In order to initiate communication, the processor 1020 transfers command information to the transceiver 1031, for example, to transmit a radio signal constituting voice communication data. The antenna serves to transmit and receive a radio signal. When the radio signal is received, the transceiver 1031 may transfer a signal to be processed by the processor 1020, and may convert the signal into a baseband signal. The processed signal may be converted into audible or readable information which is output through the speaker 1042.

The speaker 1042 outputs a result related to a sound processed by the processor 1020. The microphone 1052 receives a sound-related input to be used by the processor 1020.

A user presses (or touches) a button of the input unit 1053 or drives voice (activates voice) by using the microphone 1052 to input command information such as a phone number or the like. The processor 1020 receives the command information, and performs a proper function such as calling the phone number or the like. Operational data may be extracted from the SIM card or the memory 1010. In addition, the processor 1020 may display command information or operational information on the display 1041 for user's recognition and convenience.

<Scenario to which Disclosure of the Present Specification is Applicable>

Hereinafter, a scenario to which the aforementioned disclosures of the present disclosure are applicable will be described.

In the present specification, an always-on PDU session for URLLC having a low latency characteristic may be used for artificial intelligence, robots, autonomous driving, extended reality, etc., in the 5G scenario described below.

<5G Usage Scenario>

Figure 20:
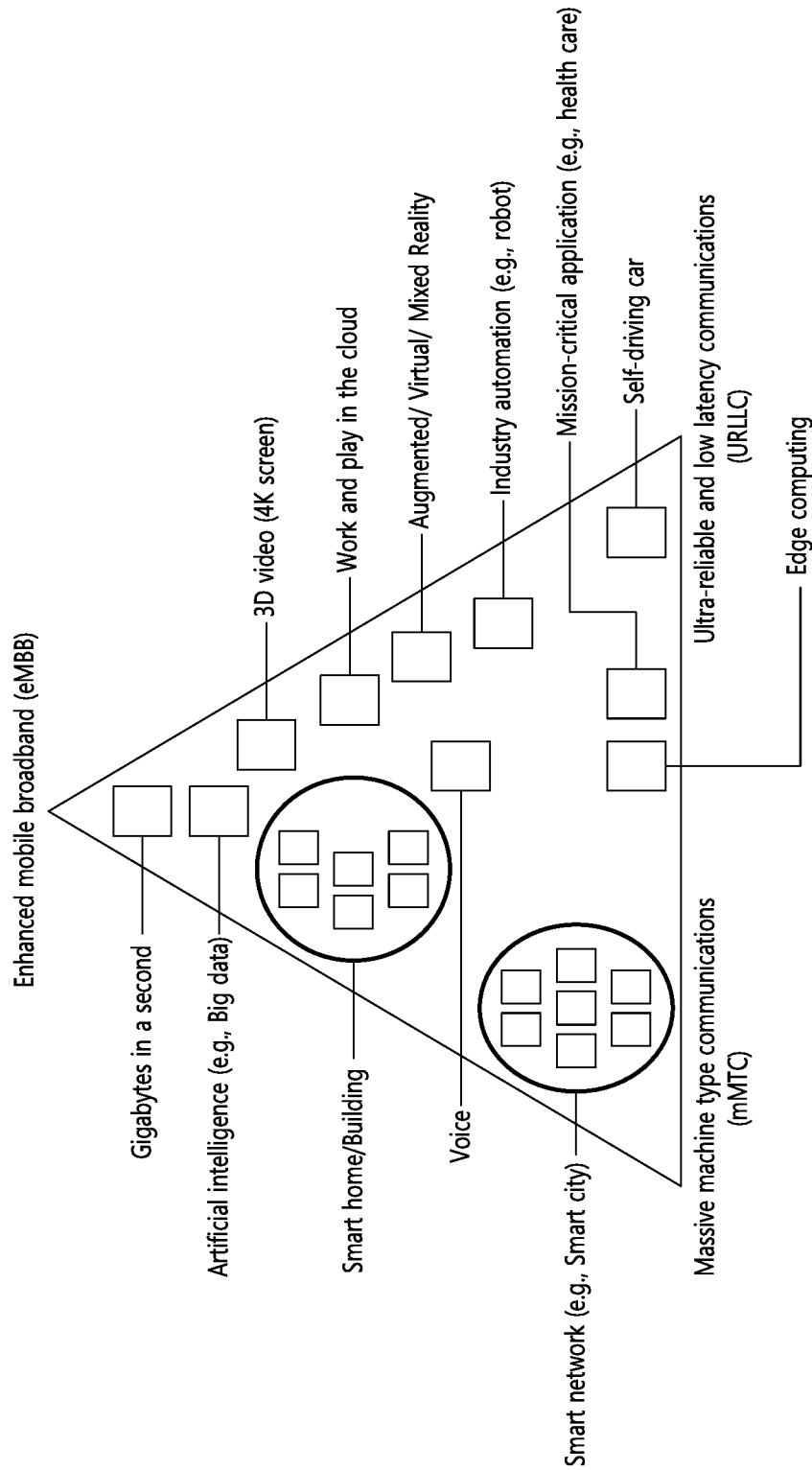
FIG. 20 shows an example of a 5G usage scenario.

FIG. 20 shows an example of a 5G usage scenario.

The 5G usage scenario of FIG. 20 is for exemplary purposes only, and thus technical features of the present disclosure are also applicable to other 5G usage scenarios not shown in FIG. 20.

Referring to FIG. 20, three main requirement areas of 5G includes: (1) an enhanced mobile broadband (eMBB) area; (2) a massive machine type communication (mMTC) area; and (3) an ultra-reliable and low latency communications (URLLC) area. In some usage examples, a plurality of areas may be required for optimization. In other usage examples, only one key performance indicator (KPI) may be focused. The 5G supports these various usage examples in a flexible and reliable manner.

The eMBB focuses on overall improvement of a data rate, latency, user density, mobile broadband access capacity, and coverage. The eMBB aims at a throughput of about 10 Gbps. The eMBB allows to surpass basic mobile Internet access, and covers sufficient interactive tasks, media in a cloud or augmented reality, and entertainment application. Data is one of the core engine for 5G, and it seems that a dedicated voice service can be seen for the first time in the 5G era. In the 5G, it is expected that voice will be simply processed with an application program by using a data connection provided by a communication system. A main reason of an increased traffic amount is an increase in a content size and an increase in the number of applications requiring a high data transfer rate. A streaming service (audio and video), interactive video, and mobile Internet connectivity will be more widely used as more devices are connected to the Internet. These many applications require always-on connectivity to push real-time information and notifications to a user. There is a rapid increase in cloud storage and applications in a mobile communication platform, which is applicable to both work and entertainment. The cloud storage is a special example of driving an increase in an uplink data transfer rate. The 5G is also used for a remote task on the cloud, and requires much lower end-to-end latency to maintain excellent user experience when a tactile interface is used. Taking entertainment for example, cloud games and video streaming are another key element requiring improvement in mobile broadband capability. The entertainment is essential in a smartphone and a tablet anywhere, including a high mobility environment such as a train, a car, and an airplane. Another usage example is augmented reality and information retrieval for entertainment. Herein, the augmented reality requires very low latency and an instantaneous data amount.

The mMTC is designed to enable communication between a plenty of low-cost devices driven by batteries and is intended to support an application such as smart metering, logistics, and field and body sensors. The mMTC aims at about 10-year-lifespan batteries and/or about million devices per square kilometer (1 km2). The mMTC may configure a sensor network by seamlessly connecting an embedded sensor in all sectors, and is one of the most expected 5G usage examples. Potentially, it is predicted that the number of IoT devices will reach 20.4 billion by 2020. A smart network utilizing industrial IoT is one of areas where the 5G plays a key role in enabling smart cities, asset tracking, smart utilities, agriculture, and security infrastructures.

The URLLC allows a device and a machine to communicate with very high reliability, very low latency, and high availability, and thus is identical to communication and control between self-driving vehicles, industrial control, factory automation, mission-critical applications such as remote operations and healthcare, smart grids, and public safety applications. The URLLC aims at a latency of about 1 ms. The URLLC includes a new service which will change the industry through a link with high-reliability/ultra-low latency such as remote control and self-driving vehicles. A level of reliability and latency is essential for smart grid control, industrial automation, robotics, and drone control and adjustment.

Next, a plurality of usage examples included in the triangle of FIG. 20 will be described in greater detail.

In 5G, fiber-to-the-home (FTTH) and cable-based broadband (or DOCSIS) may be compensated as a means of providing a stream rated in the range from hundreds of megabits per second to gigabits per second. This fast speed may be required not only in virtual reality (VR) and augmented reality (AR) but also in transferring TV broadcasting in the resolution of at least 4 K (6K, 8K, or higher). VR and AR applications include almost immersive sports events. A specific application may require a special network configuration. For example, in case of the VR game, a game company may have to integrate a core server with an edge network server of an operator in order to minimize latency.

Automotive is expected to become an important new engine for 5G, together with many usages for mobile communications for vehicles. For example, entertainment for a passenger demands high capacity and high mobile broadband at the same time. This is because future users will continue to expect high-quality connectivity regardless of their locations and speeds. Another usage example of the automotive sector is an augmented reality dashboard. Through the augmented reality dashboard, a driver is able to identify an object, in the dark, shown above that the driver is seeing through a windshield. The augmented reality dashboard displays information to be reported to the deriver as to a distance and movement of an object in an overlapping manner. In the future, a radio module will enable communication between vehicles, information exchange between a vehicle and a supported infrastructure, and information exchange between an automotive and another connected device (e.g., a device carried by a pedestrian). The safety system guides an alternative course of action so that the driver can drive more safely, thereby decreasing a risk of accidents. A next step will be a remote control vehicle or a self-driving vehicle. This requires very reliable and very fast communication between different self-driving vehicles and/or between an automotive and an infrastructure. In the future, the self-driving vehicle will perform all driving activities, and the driver will focus only on erroneous traffic which cannot be identified by the vehicle itself. A technical requirement of the self-driving vehicle is ultra-low latency and ultra-high reliability so that traffic safety is increased to a level that cannot be achieved by humans.

A smart city and a smart home, referred to as a smart society, will be embedded in a high-density wireless sensor network as an example of a smart network. A distributed network of an intelligent sensor will identify a condition for cost and energy-efficient maintenance of a city or home. A similar configuration may be performed for each household. A temperature sensor, a window and heating controller, a burglar alarm, and home appliance are all wirelessly connected. Many of these sensors typically require a low data rate, low power, and low cost. For example, however, real-time HD video may be required in a specific-type device for surveillance.

Since consumption and distribution of energy, including heat or gas, are highly dispersed, automated control of a distributed sensor network is required. The smart grid interconnects these sensors by using digital information and communication techniques to collect information and act according to the information. This information may include acts of suppliers and consumers, allowing the smart grid to improve distribution of fuels such as electricity in an efficient, reliable, production sustainable, and automated manner. The smart grid may be regarded as another sensor network with low latency.

The health sector has many applications which can benefit from mobile communication. A communication system may support telemedicine which provides a clinical care in remote locations. This may help to reduce a barrier for a distance, and may improve access to a medical service which cannot be persistently used in a far rural area. This is also used to save lives in a critical care and an emergency situation. A wireless sensor network based on mobile communication may provide remote monitoring and sensors for parameters such as heart rates and blood pressure.

Wireless and mobile communications are becoming gradually important in an industrial application sector. Wiring is expensive in terms of installation and maintenance cost. Therefore, a possibility of replacing a cable with a wireless link that can be reconfigured is an attractive opportunity in many industrial sectors. However, to achieve this, wireless connectivity is required to operate with latency, reliability, and capacity similar to those of a cable, and to be managed in a simplified manner. Low latency and very low error probability are new requirements, which requires 5G connectivity.

Logistics and cargo tracking are an important usage example for mobile communication which enables inventory and package tracking anywhere by using a location-based information system. An example of using logistics and cargo tracking typically requires a low data rate, but requires wide range and reliable location information.

<Artificial Intelligence (AI)>

Artificial intelligence refers to a sector that studies artificial intelligence and a methodology for creating it. Machine learning refers to a sector that defines various problems dealt in an artificial intelligent sector and studies a methodology for solving the problems. The machine learning is also defined as an algorithm that improves performance of a task through a steady experience for a certain task.

An artificial neural network (ANN) is a model used in machine learning, and may refer to an overall model having problem-solving ability and consisting of artificial neurons (nodes) constructing a network by combining synapses. The ANN may be defined by a connectivity pattern between neurons of different layers, a leaning processor for updating a model parameter, and an activation unction for generating an output value.

<Robot>

A robot may mean a machine which automatically operates or processes a given task according to its own capability. In particular, a robot having a function of performing an operation by recognizing an environment and by autonomously making a decision may be referred to as an intelligent robot.

The robot may be classified for industrial, medical, household, and military purposes depending on the purpose or field of use.

The robot may include a driving unit having an actuator or a motor to perform various physical operations such as moving a robot joint. In addition, a movable robot may include a wheel, a brake, a propeller, and the like in the driving unit, thereby being able to driving on the ground or flying in the air through the driving unit.

<Self-Driving (Autonomous-Driving)>

Self-driving means an autonomous-driving technique, and a self-driving vehicle means a vehicle that travels without user's manipulation or with minimum user' manipulation.

For example, the self-driving may include all of a technique for maintaining a lane while driving, a technique for automatically controlling speed such as adaptive cruise control, a technique for automatically travelling along a predetermined route, and a technique for travelling by automatically setting a route when a destination is determined.

The vehicle may include all of a vehicle having only an internal combustion engine, a hybrid vehicle having an internal combustion engine and an electric motor together, and an electric vehicle having only an electric motor, and may include not only an automotive vehicle but also a train, a motorcycle, etc.

In this case, the self-driving vehicle may be regarded as a robot having an autonomous-driving function.

<eXtended Reality (XR)>

Extended reality collectively refers to virtual reality (VR), augmented reality (AR), and mixed reality (MR). A VR technique is a computer graphic technique providing real-world objects and backgrounds only as CG images. An AR technique a computer graphic technique providing virtual CG images together on real object images. An MR technique is a computer graphic technique providing virtual objects in the real world in a mixed and combined manner.

The MR technique is similar to the AR technology in a sense that a real object and a virtual object are shown together. However, the AR technology in which the virtual object is used as a complement to the real object differs from the MR technology in which the virtual object and the real object are used in an equal manner.

The XR technique may be applied to a head-mount display (HMD), a head-up display (HUD), a mobile phone, a tablet PC, a laptop, a desktop, TV, a digital signage, etc., and a device to which the XR technique is applied may be referred to as an XR device.

Figure 21:
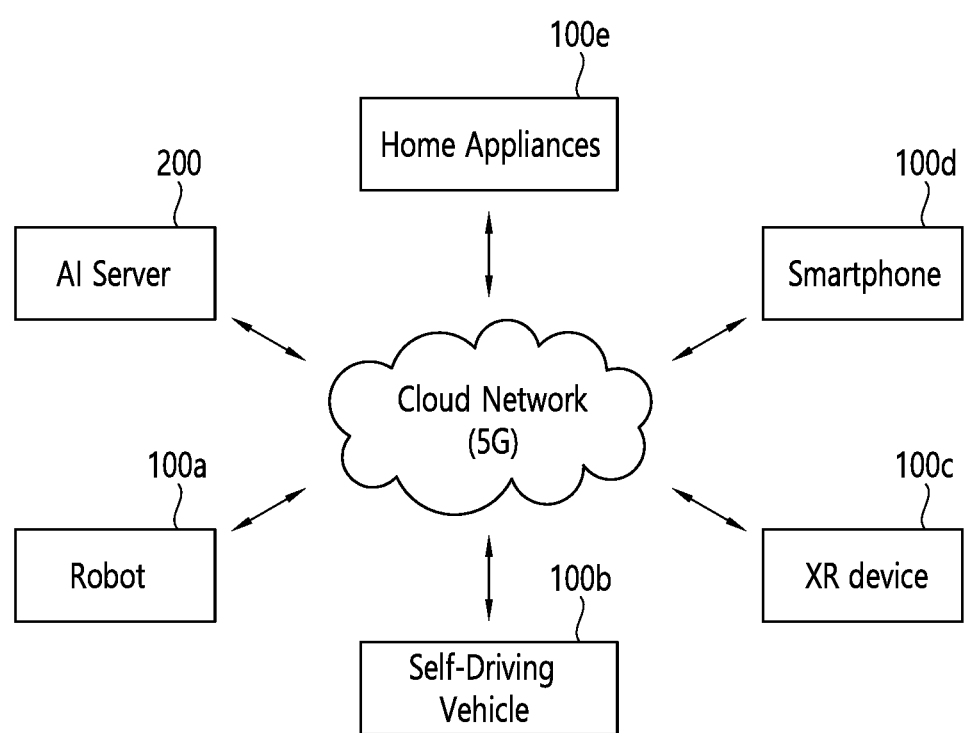
FIG. 21 shows an AI system 1 according to an embodiment.

FIG. 21 shows an AI system 1 according to an embodiment.

Referring to FIG. 21, in the AI system 1, at least one of an AI server 200, a robot 100a, a self-driving vehicle 100b, an XR device 100c, a smart phone 100d, and a home appliance 100e is connected to a cloud network 10. Herein, the robot 100a, self-driving vehicle 100b, XR device 100c, smart phone 100d, or home appliance 100e to which the AI technique is applied may be referred to as AI devices 100a to 100e.

The cloud network 10 may mean a network which constructs part of a cloud computing infrastructure or which exists in the cloud computing infrastructure. Herein, the cloud network 10 may be configured by using a 3G network, a 4G or long term evolution (LTE) network, or a 5G network.

That is, each of the devices 100a to 100e and 200 constituting the AI system 1 may be connected to each other through the cloud network 10. In particular, the devices 100a to 100e and 200 may communicate with each other via a base station, but may communicate with each other directly without having to use the base station.

The AI server 200 may include a server which performs AI processing and a server which performs an operation for big data.

The AI server 200 may be connected to at least one of the AI devices constituting the AI system 1, that is, the robot 100a, the self-driving vehicle 100b, the XR device 100c, the smart phone 100d, and the home appliance 100e through the cloud network 10, and may assist at least part of AI processing of the connected AI devices 100a to 100e.

In this case, the AI server 200 may serve to learn an artificial neural network according to a machine learning algorithm on behalf of the AI devices 100a to 100e, and may directly store a learning model or transmit it to the AI devices 100a to 100e.

In this case, the AI server 200 may receive input data from the AI devices 100a to 100e, infer a result value for the input data received using the learning module, and generate a control command or a response based on the inferred result value to transmit it to the AI devices 100a to 100e.

Alternatively, the AI devices 100a to 100e may infer the result value for the input data by using a direct learning model and generate a control command and a response based on the inferred result value.

Hereinafter, various embodiments of the AI devices 100a to 100e to which the aforementioned techniques are applied will be described.

<AI+Robot>

The robot 100a may be implemented as a guide robot, a carrying robot, a cleaning robot, a wearable robot, an entertainment robot, a pet robot, an unmanned flying robot, etc., by applying the AI technique.

The robot 100a may include a robot control module for controlling an operation, and the robot control module may mean a software module or a chip implementing the software module as hardware.

The robot 100a may use sensor information acquired from various types of sensors to obtain status information of the robot 100a, to detect (recognize) a surrounding environment and an object, to generate map data, to determine a travel route and a driving plan, to determine a response for user interaction, or to determine an operation.

Herein, the robot 100a may use the sensor information acquired from at least one sensor among a lidar, a radar, and a camera to determine a travel path and a driving plan.

The robot 100a may use a leaning model consisting of at least one artificial neural network to perform the aforementioned operations. For example, the robot 100a may use the leaning model to recognize a surrounding environment and an object, and may use the recognized surrounding environment information or object information to determine an operation. Herein, the leaning model may be learned directly from the robot 100a or learned from an external device such as the AI server 200 or the like.

In this case, the robot 100a may generate a result and perform an operation by directly using the learning model. However, it is also possible to perform an operation by transmitting sensor information to the external device such as the AI server 200 or the like and by receiving a result generated based thereon.

The robot 100a may determine the travel path and the driving plan by using at least one of map date, object information detected from sensor information, and object information acquired from an external device, and may control a driving unit so that the robot 100a travels according to the determined travel path and driving plan.

The map data may include object identification information on various objects arranged in a space in which the robot 100a moves. For example, the map data may include object identification information on stationary objects such as walls, doors, or the like and movable objects such as flowerpots, desks, or the like. In addition, the object identification information may include a name, a type, a distance, a location, or the like.

In addition, the robot 100a may control the driving unit on the basis of a user's control/interaction to travel or perform an operation. In this case, the robot 100a may acquire the intention information of an interaction based on a user's action or voice utterance, and may determine a response based on the acquired intention information to perform an operation.

<Combinations of AI, Robot, Autonomous-Driving, and XR>

The self-driving vehicle 100b may be implemented as a mobile robot, a vehicle, an unmanned aerial vehicle, or the like, by applying an AI technology.

The XR device 100c may be implemented as a Head-Mount Display (HMD), a Head-Up Display (HUD) equipped in a vehicle, a television, a mobile phone, a smart phone, a computer, a wearable device, a home appliance, a digital signage, a vehicle, a stationary robot, a mobile robot, or the like, by applying the AI technology.

The robot 100a may be implemented as a guide robot, a carrying robot, a cleaning robot, a wearable robot, an entertainment robot, a pet robot, an unmanned flying robot, or the like, by applying the AI technology and an autonomous-driving technology.

The robot 100a may be implemented as a guide robot, a carrying robot, a cleaning robot, a wearable robot, an entertainment robot, a pet robot, an unmanned aerial robot, a drone, or the like, by applying the AI technology and an XR technology.

The self-driving vehicle 100b may be implemented as a mobile robot, a vehicle, an unmanned aerial vehicle, or the like by applying the AI technology and the XR technology.

Although exemplary embodiments of the present disclosure have been described above, the scope of the present disclosure is not limited to the specific embodiments and the present disclosure may be modified, changed, or improved in various ways within the scope of the present disclosure and the category of the claims.

What is claimed is:

1. A method for performing cross link interference (CLI) measurements, the method performed by a user equipment (UE) and comprising:
    performing a measurement for a sounding reference signal (SRS) from a neighboring UE in a neighboring cell; and
    applying an offset to the measurement, based on a time difference between a downlink reference time in a serving cell and an arrival time of the SRS from the neighboring UE.

2. The method of claim 1, further comprising:
    determining information to be reported, based on the measurement.

3. The method of claim 2, further comprising:
    reporting the information to a base station.

4. The method of claim 1, wherein the offset is a constant value.

5. The method of claim 4,
    wherein the constant value includes a first value for a frequency range (FR1) and a second value for a FR2, and
    wherein the first value for FR1 is different from the second value for FR2.

6. The method of claim 5, wherein the first value for FR1 is determined as $T_c * N_{TA\_offset} + 4.67$ µs.

7. The method of claim 5, wherein the second value for FR2 is determined as $T_c*N_{TA\_offset}+3.67$ µs.

8. The method of claim 1, wherein the time difference is determined as $N_{TA\_SRS}/2+N_{TA\_offset}+N_{TA\_serving}/2-T_{sRS\_delay}$.

9. The method of claim 1, wherein the measurement is performed in TDD (time division duplex).

10. The method of claim 9, wherein a ratio between uplink and downlink in the TDD is determined dynamically by each cell.

11. A device for performing cross link interference (CLI) measurements, the device comprising:
a transceiver; and
a processor configured to perform measurements,
wherein the processor performs a measurement for a sounding reference signal (SRS) from a neighboring UE in a neighboring cell, and
wherein the processor applies an offset to the measurement, based on a time difference between a downlink reference time in a serving cell and an arrival time of the SRS from the neighboring UE.

12. The device of claim 11, wherein the processor determines information to be reported, based on the measurement.

13. The device of claim 12, wherein the transceiver reports the information to a base station.

14. The device of claim 11, wherein the offset is a constant value.

15. The device of claim 14,
wherein the constant value includes a first value for a frequency range (FR1) and a second value for a FR2, and
wherein the first value for FR1 is different from the second value for FR2.

16. The device of claim 15, wherein the first value for FR1 is determined as $T_c*N_{TA\_offset}+4.67$ µs.

17. The device of claim 15, wherein the second value for FR2 is determined as $T_c*N_{TA\_offset}+3.67$ µs.

18. The device of claim 11, wherein the time difference is determined as $N_{TA\_SRS}/2+N_{TA\_offset}+N_{TA\_serving}/2-T_{SRS\_delay}$.

19. The device of claim 11, wherein the measurement is performed in TDD (time division duplex).

20. The device of claim 19, wherein a ratio between uplink and downlink in the TDD is determined dynamically by each cell.

\* \* \* \* \*